US008523246B2

(12) United States Patent
Yamauchi

(10) Patent No.: US 8,523,246 B2
(45) Date of Patent: Sep. 3, 2013

(54) CONNECTOR

(75) Inventor: Takeshi Yamauchi, Tokyo (JP)

(73) Assignee: Koganei Corporation, Tokyo (JP)

( * ) Notice: Subject to any disclaimer, the term of this patent is extended or adjusted under 35 U.S.C. 154(b) by 247 days.

(21) Appl. No.: 12/922,606

(22) PCT Filed: Feb. 6, 2009

(86) PCT No.: PCT/JP2009/052060
§ 371 (c)(1),
(2), (4) Date: Sep. 14, 2010

(87) PCT Pub. No.: WO2009/113345
PCT Pub. Date: Sep. 17, 2009

(65) Prior Publication Data

US 2011/0018261 A1 Jan. 27, 2011

(30) Foreign Application Priority Data

Mar. 14, 2008 (JP) ................................ 2008-066220

(51) Int. Cl.
*F16L 17/00* (2006.01)

(52) U.S. Cl.
USPC ........................................ 285/364; 285/124.5

(58) Field of Classification Search
USPC ................ 285/103, 67, 325, 337, 364, 124.5, 285/124.3
See application file for complete search history.

(56) References Cited

U.S. PATENT DOCUMENTS

| | | | | |
|---|---|---|---|---|
| 5,372,392 | A | 12/1994 | Dunn et al. | |
| 5,383,689 | A * | 1/1995 | Wolfe, Sr. | 285/124.3 |
| 6,039,358 | A | 3/2000 | Stoll et al. | |
| 7,931,309 | B2 * | 4/2011 | Gebauer et al. | 285/364 |

FOREIGN PATENT DOCUMENTS

| | | | |
|---|---|---|---|
| JP | 62174101 | | 11/1987 |
| JP | 9501756 | A | 2/1997 |
| JP | 2715049 | B2 | 2/1998 |
| JP | 10238681 | A | 9/1998 |
| JP | 2902389 | B2 | 6/1999 |
| JP | 2003035300 | A | 2/2003 |

OTHER PUBLICATIONS

International Search Report from corresponding International Application No. PCT/JP2009/052060 dated Mar. 17, 2009 (10 pages).

* cited by examiner

*Primary Examiner* — Aaron Dunwoody
(74) *Attorney, Agent, or Firm* — McCormick, Paulding & Huber LLP

(57) ABSTRACT

Clamp portions (24) are provided on two sides in a vertical direction of each of flanges (21) and (22) of a filter (10) which is a fluid apparatus having a directionality, and guide grooves (28) and (29) are formed mutually different in shape between the other two sides of the flanges (21) and (22) and a coupling head (14). On the other hand, clamp portions (34) are provided on four sides of each of flanges (31) and (32) of a regulator (11) which is a fluid apparatus having no directionality, and clamp grooves (35) are formed between the clamp portions (34) and a coupling head (18). A connector (13) includes tongue portions (51) engaged with the clamp portions (24) and (34), guide protrusions (53) inserted into the guide groove (28) and the clamp groove (35), and guide protrusions (54) inserted into the guide groove (29) and the clamp groove (35), and the regulator (11) is coupled to the filter (10) in any posture.

6 Claims, 26 Drawing Sheets

CONNECTOR

CROSS REFERENCE TO RELATED APPLICATIONS

This application is entitled to the benefit of and incorporates by reference essential subject matter disclosed in International Patent Application No. PCT/JP2009/052060 filed on Feb. 6, 2009 and Japanese Patent Application No. JP2008-066220 filed Mar. 14, 2008.

TECHNICAL FIELD

The present invention relates to a connector which detachably couples fluid apparatuses such as a filter, a regulator, and a lubricator with each other in an air-tight manner.

BACKGROUND ART

Compressed air is supplied from an air pressure source to a pneumatic actuator via a pneumatic circuit, the pneumatic actuator converting fluid energy to mechanical energy like a pneumatic cylinder or the like. The pneumatic circuit is provided with a filter for removing dusts or moisture in the compressed air supplied from the air pressure source, an also provided with a regulator for adjusting pressure of the compressed air supplied to the pneumatic actuator. Further, when the compressed air is supplied to the pneumatic actuator after a mist lubricant is injected into the compressed air, a lubricator is provided in the pneumatic circuit.

Fluid apparatuses such as a filter and a regulator are mutually coupled detachably to be utilized as an air treatment unit in order to facilitate maintenance and inspection of the fluid apparatuses and they are provided in the pneumatic circuit. A connector is used for mutually coupling the fluid apparatuses detachably in an air-tight manner. The connector includes a member which has a through-hole and seal faces and is disposed between fluid ports of respective fluid apparatuses and a member which mutually fastens fluid apparatuses adjacent to each other, and the fluid apparatuses are joined to each other by the connector in an air-tight manner and are caused to communicate with each other through the through-hole. Such connectors are described in Patent Documents 1 to 3, for example.

Patent Document 1: Japanese Patent Application Laid-Open Publication (Translation of PCT Application) No. 09-501756

Patent Document 2: Japanese Patent No. 2715049

Patent Document 3: Japanese Patent No. 2902389

DISCLOSURE OF THE INVENTION

Problems to be Solved by the Invention

The filter includes a coupling head provided with a fluid port on an inflow side and a fluid port on an outflow side, and a bowl assembled to the coupling head for receiving water droplets or dusts removed from air, and the bowl is attached to the pneumatic circuit such that the bowl is positioned below the coupling head. The lubricator is also attached to the pneumatic circuit such that a bowl receiving lubricant is positioned on a lower side. When the filter or the lubricator is installed, it is necessary to ensure a vertical directionality thereof in this manner, and when a regulator is coupled to a filter, the regulator is coupled to the filter such that a valve assembly is positioned below the coupling head while correspondence to the filter is maintained. Accordingly, the air treatment unit is assembled such that respective functional parts of the fluid apparatuses are positioned on a lower side.

However, when another apparatus is arranged around the air treatment unit, such a case occurs that the functional parts of the fluid apparatus interfere with the other apparatus so that many apparatuses cannot be arranged in a limited space. The filter or the regulator must be arranged such that the bowl which is the functional part is positioned on the lower side, and so has directionality, but the regulator does not have directionality, where the regular can perform its function even when the valve assembly which is the functional part is positioned above the coupling head or it is oriented in a horizontal direction. Similarly, a residual pressure exhaust valve does not have vertical directionality.

If a fluid apparatus which does not have directionality can be coupled to a fluid apparatus having directionality at any of a plurality of postures, another apparatus can be arranged in a limited space.

A preferred aim of the present invention is to provide a connector which can couple a fluid apparatus which does not have directionality to a fluid apparatus which has directionality at an arbitrary posture.

Means for Solving the Problems

A connector of the present invention is a connector connecting two fluid apparatuses of the same type or different types selected from: a first fluid apparatus in which a flange having a butting face at which a fluid port is opened is provided on a coupling head, the first fluid apparatus having clamp portions to which clamp grooves are formed on two sides of the flange parallel with each other between the clamp portions and the coupling head; and a second fluid apparatus in which a flange having a butting face at which a fluid port is opened is provided on a coupling head, the second fluid apparatus having clamp portions to which clamp grooves are formed on four sides of the flange between the clamp portions and the coupling head, the connector including: a coupling block provided with: a spacer portion having seal faces contacting the butting faces of the two fluid apparatuses and formed on both faces of the spacer portion and having a through-hole causing the fluid ports of the two fluid apparatuses to communicate with each other; and an operating portion provided on one side of the spacer portion; tongue portions provided on the operating portion corresponding to both the faces of the spacer portion and formed with wedge faces contacting wedge faces of the clamp portions of the two fluid apparatuses; a seal member attached between the butting face and the seal face so as to surround the through-hole; a fastening member provided with tongue portions opposed to the tongue portions of the operating portion and contacting the wedge faces of the clamp portions, the fastening member being detachably fastened to the other side of the coupling block; and guide protrusions provided on end of the operating portion, the guide protrusions being inserted into recessed guide portions formed on two sides of the flange when the coupling block is attached to the flange of the first fluid apparatus by inserting the tongue portions into one of the clamp grooves on the two sides, and the guide protrusions being capable of being inserted into any of recessed guide portions formed on the four sides of the flange, respectively, when the coupling block being attached to the flange of the second fluid apparatus by inserting the tongue portions into any of the clamp grooves on the four sides, wherein the second fluid apparatus can be coupled to the first fluid apparatus that has a vertical directionality in any direction of vertical and horizontal directions.

The connector of the present invention is the connector in which the recessed guide portions are formed between guide portions, which are provided on the other two sides of the flange of the first fluid apparatus, and the coupling head; the guide protrusions are inserted into the recessed guide portions formed on the other two sides of the flange when the coupling block is attached to the flange of the first fluid apparatus; and the clamp grooves on the four sides form the recessed guide portions into which the guide protrusions are inserted when the coupling block is attached to the flange of the second fluid apparatus.

The connector of the present invention is the connector in which a first guide protrusion provided on one end of the operating portion has a shape corresponding to one of the recessed guide portions on the two sides of the first fluid apparatus, and a second guide protrusion provided on the other end of the operating portion has a shape corresponding to the other one of the recessed guide portions on the two sides of the first fluid apparatus.

The connector of the present invention is the connector in which the one of the recessed guide portions and the other one of the recessed guide portions are different in length dimension from each other, and the first guide protrusion has a length corresponding to the one of the recessed guide portions, while the second guide protrusion has a length corresponding to the other one of the recessed guide portions.

The connector of the present invention is the connector in which the one of the recessed guide portions and the other one of the recessed guide portions are different in width dimension from each other, and the first guide protrusion has a width corresponding to the one of the recessed guide portions, while the second guide protrusion has a width corresponding to the other one of the recessed guide portions.

The connector of the present invention is the connector in which a third guide protrusion projecting toward the first guide protrusion and having a shape corresponding to the first guide protrusion is provided on one end of the fastening member, and a fourth guide protrusion projecting toward the second guide protrusion and having a shape corresponding to the second guide protrusion is provided on the other end of the fastening member.

The connector of the present invention is the connector in which a clamp groove is formed to an entire peripheral portion of the clamp portion of the second fluid apparatus, and the guide protrusions are inserted into any of the clamp grooves on the four sides when the coupling block is attached to the flange of the second fluid apparatus.

The connector of the present invention is the connector in which the recessed guide portions are formed on the two sides of the flange of the first fluid apparatus; the recessed guide portions are formed on the four sides of the flange of the second fluid apparatus; and the guide protrusions are inserted into the recessed guide portions formed on the two sides of the flange when the coupling block is attached to the flange of the first fluid apparatus, while the guide protrusions are inserted into any of the recessed guide portions on the four sides when the coupling block is attached to the flange of the second fluid apparatus.

The connector of the present invention is the connector in which a first guide protrusion provided on one end of the operating portion has a shape corresponding to one of the two recessed guide portions formed on the two sides of the first fluid apparatus, respectively, and a second guide protrusion provided on the other end of the operating portion has a shape corresponding to the other one of the two recessed guide portions formed on two sides of the first fluid apparatus, respectively.

The connector of the present invention is the connector in which the one of the recessed guide portions and the other one of the recessed guide portions are different in length dimension from each other, and the first guide protrusion has a length corresponding to the one of the recessed guide portions, while the second guide protrusion has a length corresponding to the other one of the recessed guide portions.

The connector of the present invention is the connector in which the one of the recessed guide portions and the other one of the recessed guide portions are different in sectional shape from each other, and the first guide portion has a sectional shape corresponding to the one of the recessed guide portions, while the second guide protrusion has a sectional shape corresponding to the other one of the recessed guide portions.

The connector of the present invention is the connector in which a third guide protrusion projecting toward the first guide protrusion and having a shape corresponding to the first guide protrusion is provided on one end of the fastening member, and a fourth guide protrusion projecting toward the second guide protrusion and having a shape corresponding to the second guide protrusion is provided on the other end of the fastening member.

Effects of the Invention

According to the present invention, the flange of the first fluid apparatus having the vertical directionality is provided with guide grooves on its two sides, and the guide grooves on the two sides are different in shape from each other. The flange of the second fluid apparatus having no vertical directionality is provided with clamp grooves on its four sides. The connector which connects two fluid apparatuses to each other has guide protrusions inserted into one of the guide grooves of the flange having two sides of the first fluid apparatus and inserted into any of the clamp grooves on the four sides of the second fluid apparatus. Thereby, the second fluid apparatus having no vertical directionality can be coupled to another fluid apparatus with an upright or downward posture or with a leftward or rightward posture.

Accordingly, when the second fluid apparatus is coupled to the first fluid apparatus adjacent thereto, a surrounding space which should be provided around the first fluid apparatus can be effectively utilized by setting the posture of the second fluid apparatus according to the surrounding space to arrange another apparatus in the surrounding space.

According to the present invention, not only that the first fluid apparatus and the second fluid apparatus can be coupled to each other but also that two first fluid apparatuses or two second fluid apparatuses can be coupled mutually. Respective fluid apparatuses can be coupled in any order.

BRIEF DESCRIPTIONS OF THE DRAWINGS

BEST MODE FOR CARRYING OUT THE INVENTION

Hereinafter, embodiments of the present invention will be described in detail with reference to the drawings.

Figure 1:
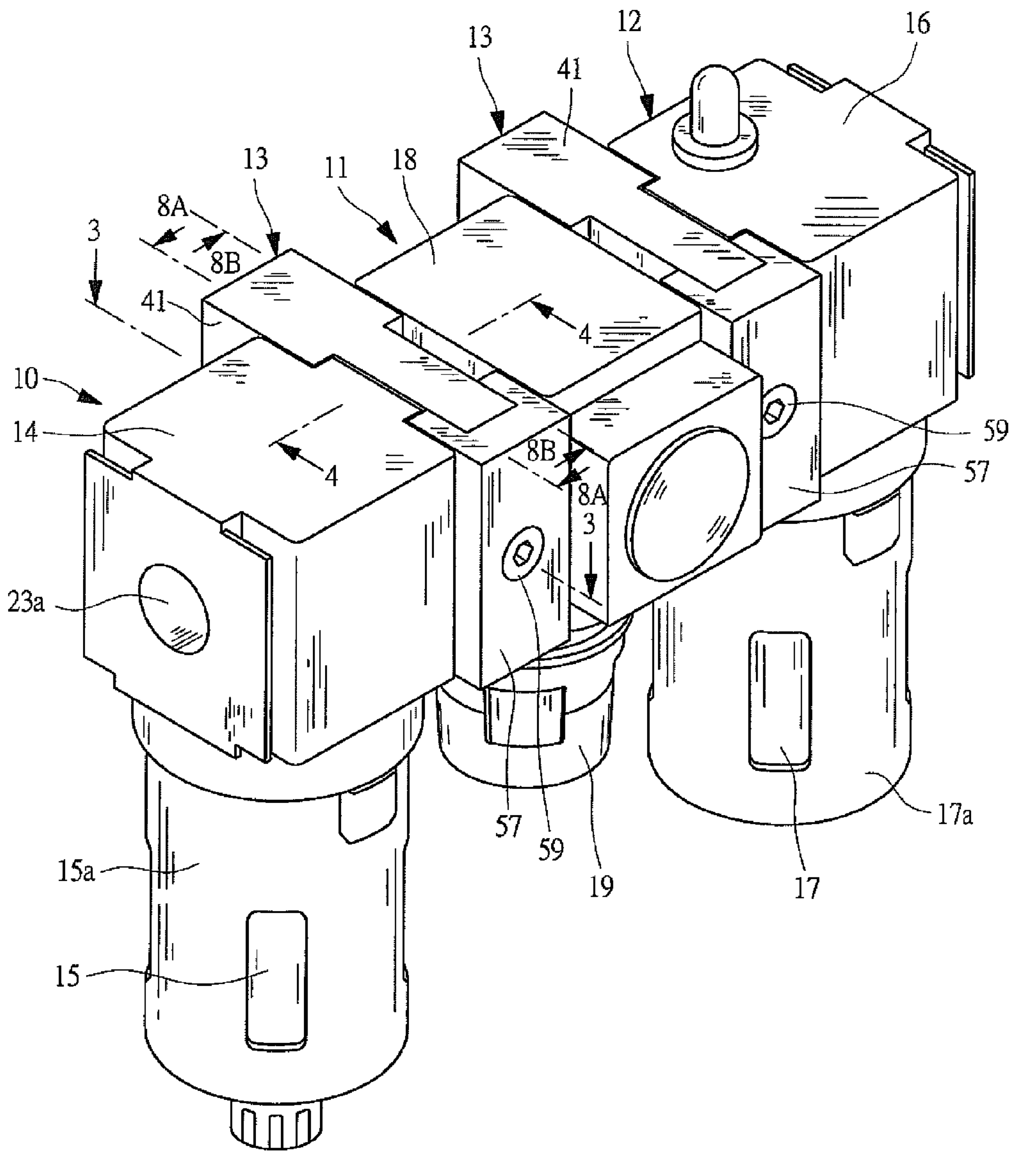
FIG. 1 is a perspective view illustrating an air treatment unit attached with a connector according to an embodiment of the present invention.

An air treatment unit illustrated in FIG. 1 includes three fluid apparatuses of a filter 10, a regulator 11, and a lubricator 12. Compressed air supplied from an air pressure source flows into the filter 10, so that moisture contained in the compressed air as fine water droplets is removed by a centrifugal separation action and a filtering action possessed by the filter 10. The compressed air which has flowed into the regulator 11 serving as a pressure-reducing valve from the filter 10 is reduced to a predetermined pressure lower than a pressure on an inlet side and guided into the lubricator 12. In the lubricator 12, lubricant is turned into a mist and mixed into the compressed air according to an air flow rate, and the lubricant is supplied to a movable portion of a pneumatic actuator.

The filter 10 has a substantially-cubic coupling head 14 connected to the regulator 11 by the connector 13, and a bowl 15 is attached to a lower side of the coupling head 14 and a filter element (not illustrated) is also attached thereto. Moisture in the compressed air which has flowed in the filter 10 is accumulated in the bowl 15 and foreign matter therein is removed by the filter element. A bowl guard 15*a* is attached to an outside of the bowl 15 so as to cover the bowl 15. The lubricator 12 similarly includes a substantially-cubic coupling head 16, and a bowl 17 receiving a lubricant is attached to a lower side of the coupling head 16, and the lubricant is turned into a mist and supplied to the compressed air. A bowl guard 17*a* is attached to an outside of the bowl 17 so as to cover the bowl 17. The filter 10 and the lubricator 12 must be arranged such that the respective bowls 15 and 17 are positioned on lower sides of the filter 10 and the lubricator 12 and they configure first fluid apparatuses having a vertical directionality.

On the other hand, the regulator 11 has a substantially-cubic coupling head 18, and a valve mechanism which adjusts pressure of the compressed air which has passed through the filter 10 to be purified is assembled in the coupling head 18. The coupling head 18 is provided with a handle 19 extending downward in FIG. 1, so that the set pressure for a pressure on the outlet side is adjusted by the handle 19. The regulator 11 may be arranged such that the handle 19 is positioned on an upper side of the regulator 11 or oriented in a horizontal direction, and the regulator 11 has any directionality of vertical and horizontal directions to configure a second fluid apparatus having no directionality.

The filter 10 and the regulator 11 are detachably coupled to each other at their coupling heads 14 and 18 in an air-tight manner by a connector 13, and the regulator 11 and the lubricator 12 are similarly coupled to each other by another connector 13.

Figure 2:
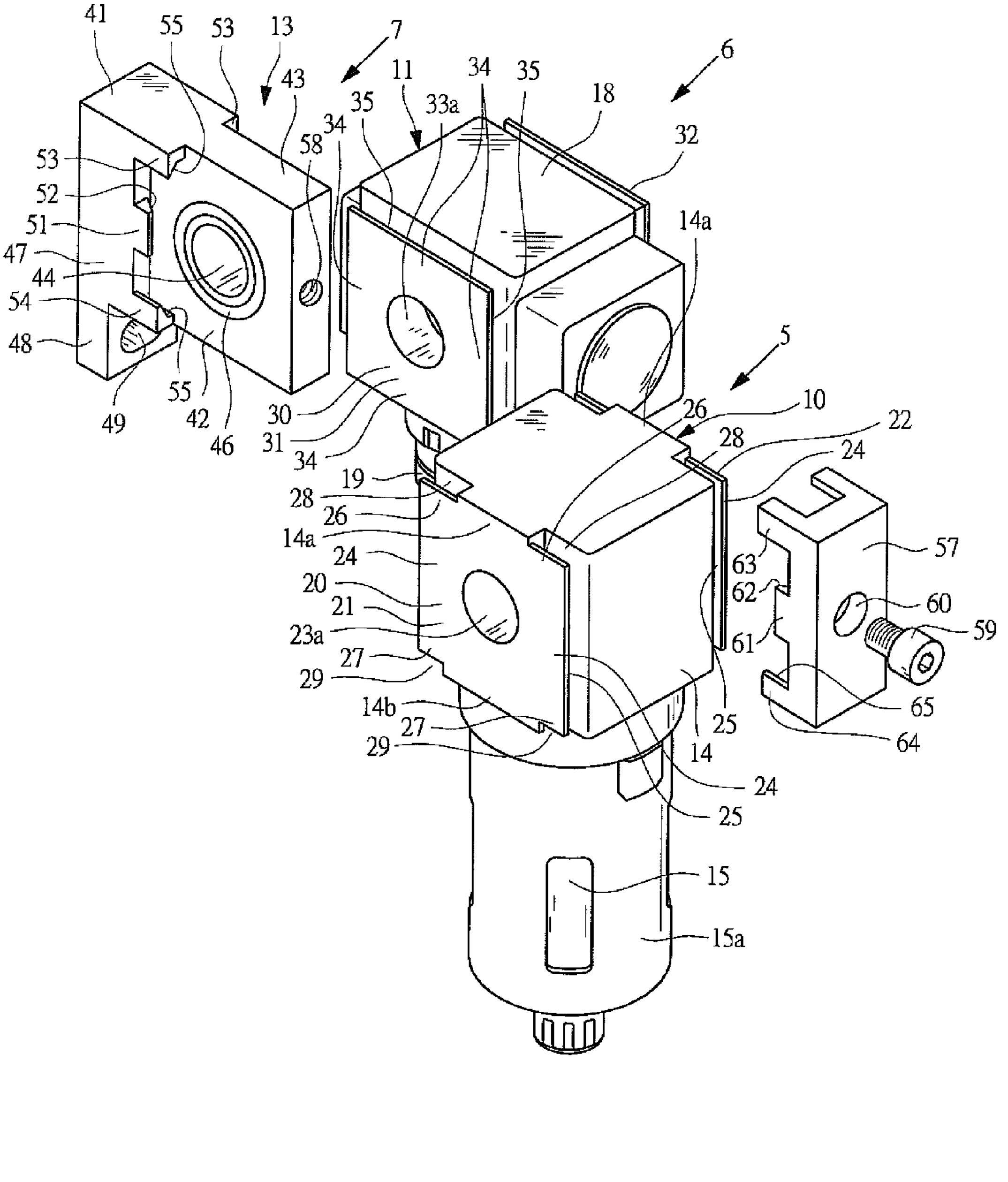
FIG. 2 is an exploded perspective view illustrating a filter, a regulator, and the connector illustrated in FIG. 1.
Figure 3:
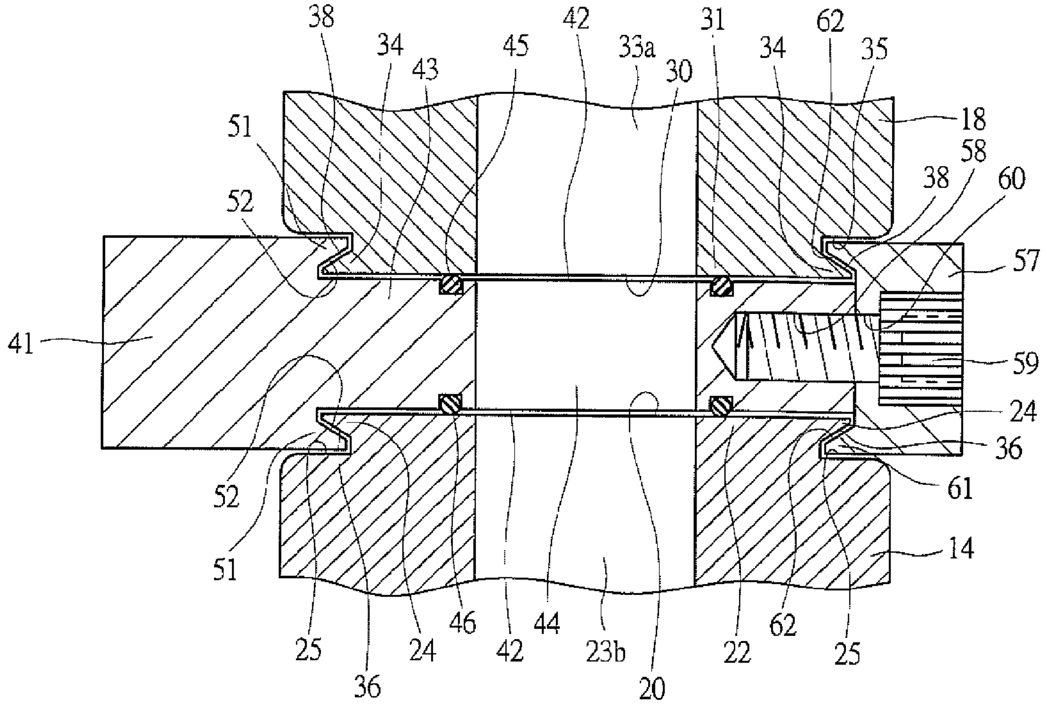
FIG. 3 is a sectional view of the air treatment unit taken along the line 3-3 in FIG. 1.
Figure 4:
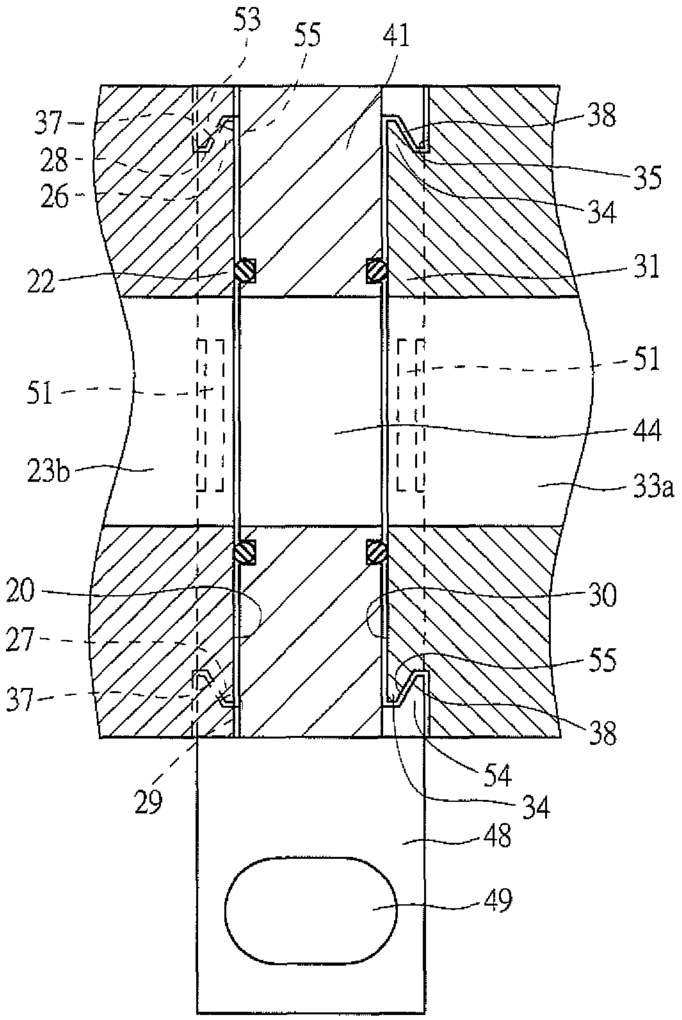
FIG. 4 is a sectional view of the air treatment unit taken along the line 4-4 in FIG. 1.
Figure 5:
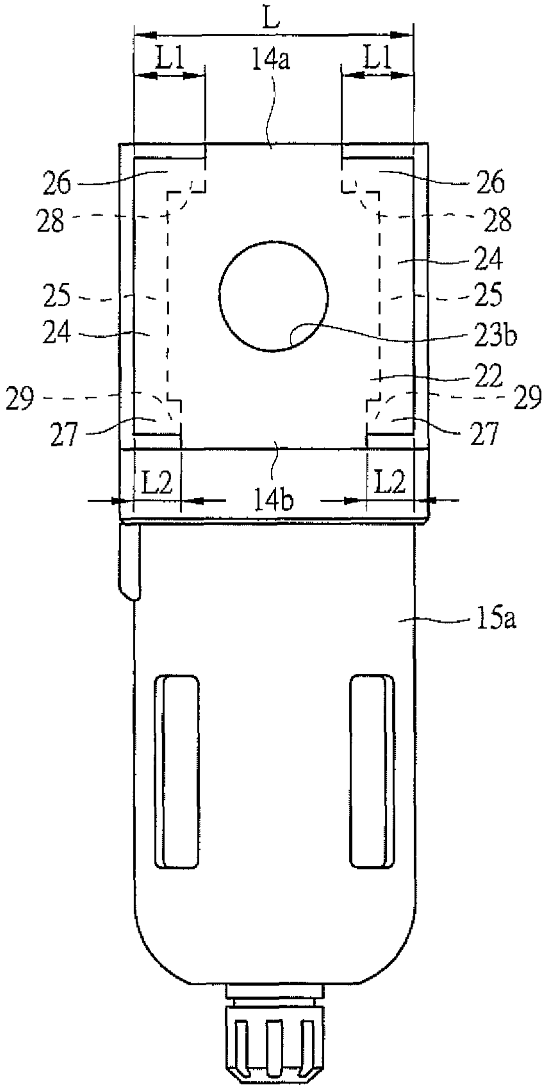
FIG. 5 is a side view of the filter viewed from a direction of the arrow 5 in FIG. 2.
Figure 6:
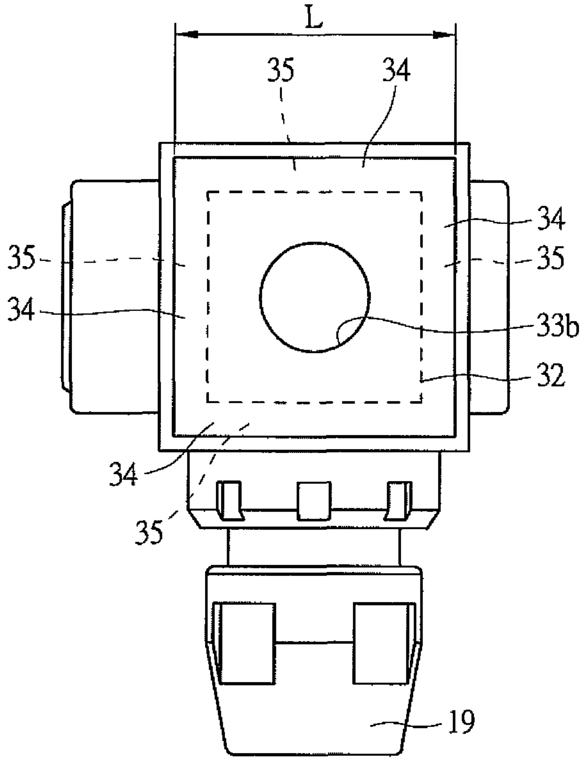
FIG. 6 is a side view of the regulator viewed from a direction of the arrow 6 in FIG. 2.
Figure 7:
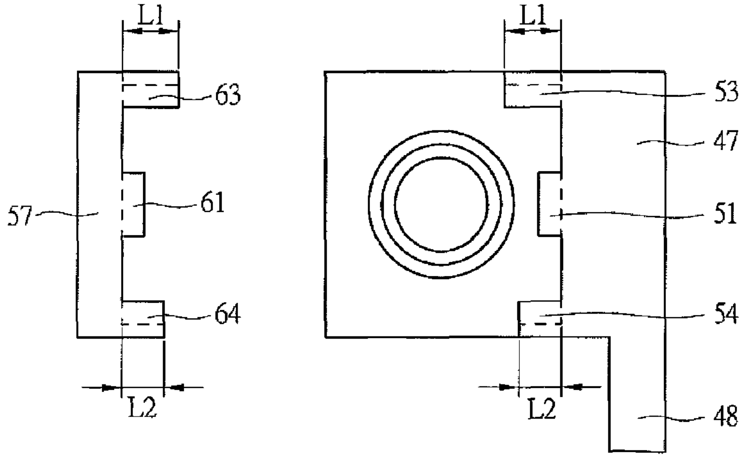
FIG. 7 is a side view of the connector viewed from a direction of the arrow 7 in FIG. 2.
Figure 8A:
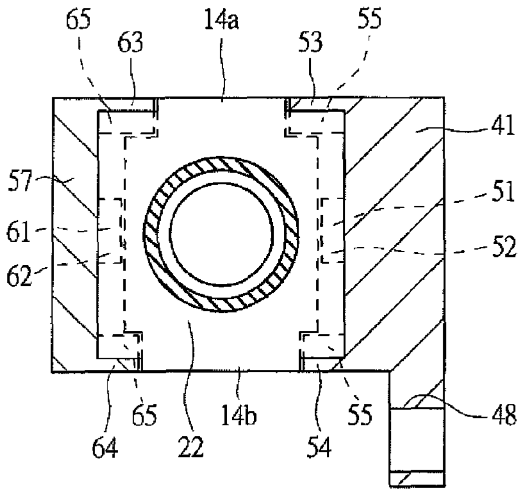
FIG. 8A is a sectional view of the air treatment unit taken along the line 8A-8A in FIG. 1.
Figure 8B:
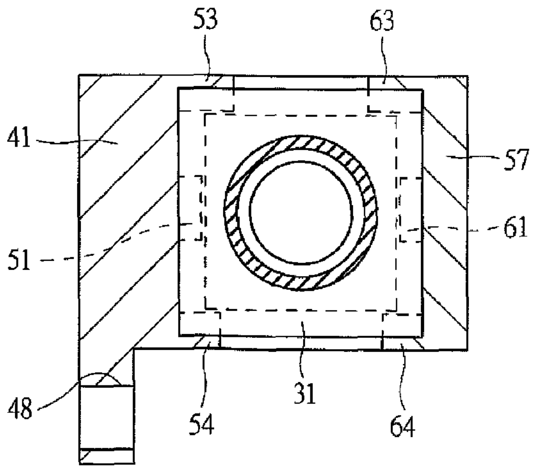
FIG. 8B is a sectional view of the air treatment unit taken along the line 8B-8B in FIG. 1.

FIG. 2 is an exploded perspective view illustrating the filter, the regulator, the connector illustrated in FIG. 1, and FIG. 3 is a sectional view of the air treatment unit taken along the line 3-3 in FIG. 1, FIG. 4 is a sectional view of the air treatment unit taken along the line 4-4 in FIG. 1, FIG. 5 is a side view of the filter viewed from a direction of the arrow 5 in FIG. 2, FIG. 6 is a side view of the regulator viewed from a direction of the arrow 6 in FIG. 2, FIG. 7 is a side view of the connector viewed from a direction of the arrow 7 in FIG. 2, FIG. 8A is a sectional view of the air treatment unit taken along the line 8A-8A in FIG. 1, and FIG. 8B is a sectional view of the air treatment unit taken along the line 8B-8B in FIG. 1.

Flanges 21 and 22 each having a butting face 20 are provided on two side faces of the coupling head 14 of the filter 10 positioned on opposite sides of the coupling head 14, respectively. As illustrated in FIG. 1 and FIG. 2, a fluid port 23*a* on an inflow side is opened on the butting face 20 of one flange 21, while a fluid port 23*b* on an outflow side is opened on the butting face 20 on the opposite side, as illustrated in FIG. 3. Thus, compressed air which has flowed from the fluid port 23*a* flows out from the fluid port 23*b* on an outflow side having foreign matter as well as moisture removed by the filter element.

The flanges 21 and 22 are each formed in a substantially-square shape, and clamp portions 24 are provided on two sides of each of the flanges 21 and 22 oriented vertically and positioned in parallel with each other, and clamp grooves 25 are formed between the clamp portions 24 and the coupling head 14. Guide portions 26 are provided on both ends of each of upper sides of the flanges 21 and 22, while guide portions 27 are provided on both ends of each of lower sides of the flanges 21 and 22. Guide grooves 28 are formed between the guide portions 26 and the coupling head 14, while guide grooves 29 are formed between the guide portions 27 and the coupling head 14. The guide groove 28 configures a first recessed guide portion, while the guide groove 29 configures a second recessed guide portion.

As illustrated in FIG. 5, the guide groove 28 on the upper side is set to have a length of a dimension L1, while the guide groove 29 on the lower side is set to have a length of a dimension L2, and the upper and lower guide grooves 28 and 29 are different in length from each other, and they are different in shape from each other. A central portion of the guide portion 26 connects to a protrusion 14*a* of the coupling head 14, and a bottom face of the guide groove 28 is defined by the protrusion 14*a*. Similarly, a bottom face of the guide groove 29 is defined by a protrusion 14*b*.

In this manner, the guide grooves 28 and 29 different in length dimension are provided on lower and upper sides of the coupling head 14 of the filter 10 having a vertical directionality, respectively. Since the lubricator 12 illustrated in FIG. 1 also has a vertical directionality as described above, the coupling head 16 is provided with the flanges 21 and 22 having a shape similar to that of the filter 10.

Flanges 31 and 32 each having a butting face 30 are provided on two side faces of the coupling head 18 of the regulator 11 positioned on opposite sides of the coupling head 18. As illustrated in FIG. 2, a fluid port 33*a* on an inflow side is opened on the butting face 30 of one flange 31, while a fluid port 33*b* on an outflow side is opened on the butting face 30 on the opposite side, as illustrated in FIG. 6. Thus, compressed air which has flowed from the fluid port 33*a* is adjusted regarding its pressure to flow out from the fluid port 33*b* on an outflow side.

The flanges 31 and 32 are each formed in a substantially-square shape, and a dimension L of each side thereof is set to substantially the same dimension as that of the respective sides of the flanges 21 and 22. Clamp portions 34 are provided on four sides of each of the flanges 31 and 32, and clamp grooves 35 are provided between the clamp portions 34 and the coupling head 18. Thus, the flanges 31 and 32, each being symmetrical regarding a vertical direction and a horizontal direction, are provided on the coupling head 18 of the regulator 11 having no vertical directionality, and the clamp grooves 35 are provided along entire peripheral faces of the flanges 31 and 32.

As illustrated in FIG. 3, a wedge face 36 inclined from the outside of the clamp portion 24 to the inside of the same toward the coupling head 14 is formed on an inner face of the clamp portion 24 of the filter 10. As illustrated in FIG. 4, a guide face 37 inclined in a direction similar to that of the wedge face 36 is formed on each of inner faces of the guide portions 26 and 27 of the filter 10. As illustrated in FIGS. 3 and 4, a wedge face 38 inclined toward the coupling head 18 according to a direction from the outside of the clamp portion 34 to the inside of the same is formed to an inner face of the clamp portion 34 of the regulator 11.

As illustrated in FIG. 2, the connector 13 has a coupling block 41. The coupling block 41 has a spacer portion 43 formed with seal faces 42 on both faces thereof to contact the butting face 20 of the filter 10 and the butting face 30 of the regulator 11, respectively, and the spacer portion 43 has dimensions corresponding to those of the flanges 22 and 31. The spacer portion 43 is formed with a through-hole 44 which causes the fluid port 23*b* of the filter 10 and the fluid port 33*a* of the regulator 11 to communicate with each other.

As illustrated in FIGS. 2 to 4, concentric seal grooves 45 are formed on the respective seal faces 42 so as to surround the through-hole 44, and seal members 46 which seal between the respective seal faces 42 and the butting faces 20 and 30 are attached to the seal grooves 45. Thereby, the respective fluid ports 23*b* and 33*a* are caused to communicate with the through-hole 44 in an air-tight manner.

The coupling block 41 has an operating portion 47 extending along one side of the spacer portion 43 and integrated with the spacer portion 43. The operating portion 47 is set to have a thickness dimension which is larger than the thickness of the spacer portion 43 and is set such that the operating portion 47 can be inserted between the coupling heads 14 and 18. As illustrated in FIG. 2, the coupling block 41 is integrally provided with a bracket 48 projecting from the operating portion 47, and the bracket 48 is formed with a mounting hole 49. The bracket 48 is provided on a lower side than the operating portion 47, and the coupling block 41 is attached to the filter 10 such that the bracket 48 is positioned on a lower side than the filter 10. Thus, the coupling block 41 has a vertical directionality and it is fixed at a predetermined installation position (not illustrated) by a fastening member such as a bolt attached to the mounting hole 49.

Thus, the connector 13 has a function of coupling the filter 10 and the regulator 11 with each other, and a function of fixing these members at the installation position. Incidentally, the bracket 48 may be integrally provided on an upper side than the operating portion 47, and in the case, the connector 13 is attached to the filter 10 such that the bracket 48 is positioned on an upper side. However, if only the function of coupling the filter 10 and the regulator 11 with each other is given to the connector 13, it is unnecessary to provide the bracket 48.

Tongue portions 51 are provided on the operating portion 47 so as to correspond to two faces of the spacer portion 43, and each of the tongue portions 51 projects towards a side of the opposite side of the spacer portion 43. The respective tongue portions 51 are each formed with a wedge face 52 selectively contacting one of the wedge face 36 of the clamp portion 24 and the wedge face 38 of the clamp portion 34.

Guide protrusions 53 and 54 are provided on both upper end and lower ends of the operating portion 47 corresponding to two sides of the spacer portion 43, and the respective guide protrusions 53 and 54 project from the operating portion 47 in parallel with the tongue portion 51. The guide protrusion 53 configures a first guide protrusion, while the guide protrusion 54 configures a second guide protrusion. The guide protrusions 53 and 54 are each formed with an inclined guide face 55 selectively contacting one of the guide face 37 and the wedge face 38. The guide protrusions 53 on the upper side each has the length L1 corresponding to the guide groove 28 of the filter 10, while the guide protrusions 54 on the lower side each has the length L2 corresponding to the guide groove 29 of the filter 10. Therefore, the coupling block 41 is attached to the filter 10 such that the bracket 48 is positioned on a lower side. On the other hand, since the clamp grooves 35, each forming a recessed guide portion into which the guide protrusion is inserted, are formed over the entire periphery of the flange 31 in the regulator 11, the regulator 11 can be attached to the coupling block 41 even if the handle 19 is oriented in any direction of downward, upward, rightward, or leftward directions in FIG. 2.

A fastening member 57 can be detachably attached to the coupling block 41. The fastening member 57 has a width and a length corresponding to the operating portion 47, and a mounting hole 60 is formed in the fastening member 57, the mounting hole 60 being to be attached with a hexagon socket head cap bolt 59 connected to a screw hole 58 formed on an end face of the spacer portion 43 of the coupling block 41. The fastening member 57 is fastened to the coupling block 41 by the bolt 59. Tongue portions 61 corresponding to the respective tongue portions 51 are provided on inner faces of the fastening member 57 in a projecting manner. The tongue portions 61 are each formed with a wedge face 62 selectively contacting one of the wedge face 36 of the clamp portion 24 and the wedge face 38 of the clamp portion 34.

Guide protrusions 63 and 64 are provided on both upper end and lower ends of the fastening member 57 so as to correspond to both the faces of the spacer portion 43, and the respective guide protrusions 63 and 64 project from inner faces of the fastening member 57 in parallel with the tongue portion 61. The respective guide protrusions 63 and 64 are formed with inclined guide faces 65 contacting the guide face 37 and the wedge face 38. The guide protrusion 63 configures a third guide protrusion, while the guide protrusion 64 configures a fourth guide protrusion. The guide protrusions 63 on an upper side each has the length L1 corresponding to the guide groove 28 of the filter 10, while the guide protrusions 64 on a lower side each has the length L2 corresponding to the guide groove 29 of the filter 10. Therefore, the fastening member 57 is attached to the filter 10 such that the guide protrusions 63 on the upper side are positioned on an upper side. On the other hand, the regulator 11 can be attached to the fastening member 57 even if the handle 19 is oriented in any direction of downward, upward, rightward, or leftward directions in FIG. 2.

To couple the filter 10 and the regulator 11 to each other using the connector 13, the coupling head 14 of the filter 10 and the coupling head 18 of the regulator 11 are attached to the coupling block 41. At this time, the guide protrusion 53 serving as the first guide protrusion and extending along one face side of the spacer portion 43 is inserted into the guide groove 28 on the upper side, and the guide protrusion 54 serving as the second guide protrusion is inserted into the guide groove 29 on the lower side, such that the bracket 48 of the coupling block 41 and the bowl 15 of the filter 10 are positioned on the lower side in FIG. 2. Thereby, the wedge face 52 of the tongue portion 51 contacts the wedge face 36 of the clamp portion 24. On the other hand, since the clamp grooves 35, each forming the recessed guide portion between the clamp portions 34 on four sides of the regulator 11 and the coupling head 18, are formed over the entire outer peripheral face of the flange 31, the guide protrusion 53 serving as the first guide protrusion and extending along the other face side of the spacer portion 43 is inserted into the clamp groove 35 on the upper side, and the guide protrusion 54 serving as the second guide protrusion is inserted into the clamp groove 35 on the lower side. Thereby, the wedge face 52 of the tongue portion 51 contacts the wedge face 38 of the clamp portion 34.

In this manner, the filter 10 and the regulator 11 are attached to the coupling block 41 at the respective coupling heads 14 and 18. Since both the guide protrusions 53 and 54 can also be inserted into the clamp groove 35 on any side of the clamp grooves 35 on four sides formed between the clamp portions 34 and the coupling head 18, attachment of the regulator 11 to the coupling block 41 can be performed in a downward direction where the handle 19 is positioned on a lower side, an upward direction where the handle 19 is positioned on an upper side, or a leftward or rightward direction where the handle 19 is oriented leftward or rightward.

To attach the fastening member 57 to the coupling block 41, the guide protrusion 63 of the fastening member 57 serving as the third guide protrusion is inserted into the guide groove 28 on the upper side, and the guide protrusion 64 serving as the fourth guide protrusion is inserted into the guide groove 29 on the lower side. Thereby, the wedge face 62 of the tongue portion 61 contacts the wedge face 36 of the clamp portion 24. On the other hand, the guide protrusion 63 serving as the other third guide protrusion is inserted into the clamp groove 35 on the upper side, and the guide protrusion 64 serving as the other fourth guide protrusion is inserted into the clamp groove 35 on the lower side. Thereby, the wedge face 62 of the tongue portion 61 contacts the wedge face 38 of the clamp portion 34. By jointing the bolt 59 to the screw hole 58 by screwing under this situation, the coupling block 41 and the fastening member 57 are fastened to each other so as to come close to each other, and the filter 10 and the regulator 11 are coupled to each other in an air-tight manner by the connector 13.

When the air treatment unit composed of the filter 10 and the regulator 11 is installed at an installation site, the connector 13 is fastened to the installation site in a state where the filter 10 and the regulator 11 have been coupled to each other by the connector 13. However, such a configuration can be adopted that the fastening member 57 is attached to the coupling block 41 after the filter 10 and the regulator 11 are assembled to the coupling block 41 of the connector 13 in a state where the connector 13 has been preliminarily fastened to the installation site. In any of the cases, the air treatment unit is installed such that the bowl 15 of the filter 10 is positioned on a lower side.

As illustrated in FIG. 1, when the air treatment unit composed of the filter 10, the regulator 11 and the lubricator 12 is installed at the installation position, the lubricator 12 is coupled to the regulator 11 using still another connector 13. A pipe on an upstream side is connected to the filter 10 of the air treatment unit illustrated in FIG. 1 by the connector 13, and an end of the pipe is provided with a connection joint having a flange in the same shape as that of the flanges 21, 22 or the flanges 31, 32. The lubricator 12 of the air treatment unit is connected to a pipe on a downstream side by the connector 13, and an end of the pipe is provided with a connection joint having a flange with the same shape as that of the flanges 21, 22 or the flanges 31, 32. Similarly, in the air treatment unit composed of the filter 10 and the regulator 11, a pipe on an upstream side is coupled to the filter 10 by the connector 13, and a pipe on a downstream side is coupled to the regulator 11 by the connector 13.

Figure 9:
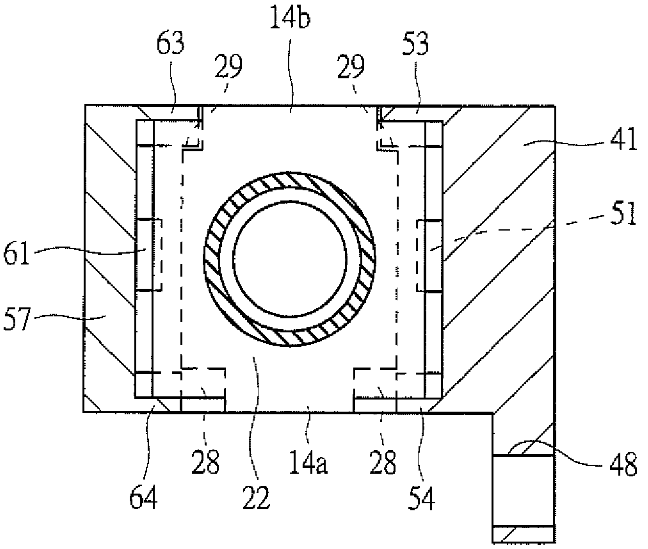
FIG. 9 is a sectional view illustrating a state that a coupling block and a fastening member are vertically inverted with respect to a filter.

FIG. 9 is a sectional view illustrating a state that the positional relationship of the filter 10 having a vertical directionality is vertically inverted with respect to the coupling block 41 and the fastening member 57. When the guide protrusion 53 of the coupling block 41 is inserted into the guide groove 29 and the guide protrusion 54 is inserted into the guide groove 28, the long guide protrusion 53 of the coupling block 41 abuts on the bottom face of the short guide groove 29, so that the coupling block 41 cannot be assembled up to an assembling-completion position. Similarly, when the guide protrusion 63 of the fastening member 57 is inserted into the guide groove 29 and the guide protrusion 64 is inserted into the guide groove 28, the fastening member 57 cannot be assembled up to an assembling-completion position. Therefore, a worker is prevented from assembling the filter 10 and the connector 13 in a state that the positional relationship of the filter 10 and the connector 13 is upside-down. On the other hand, the regulator 11 having no vertical directionality can be attached to the connector 13 in any posture of upward, downward, rightward, or leftward.

Figure 10:
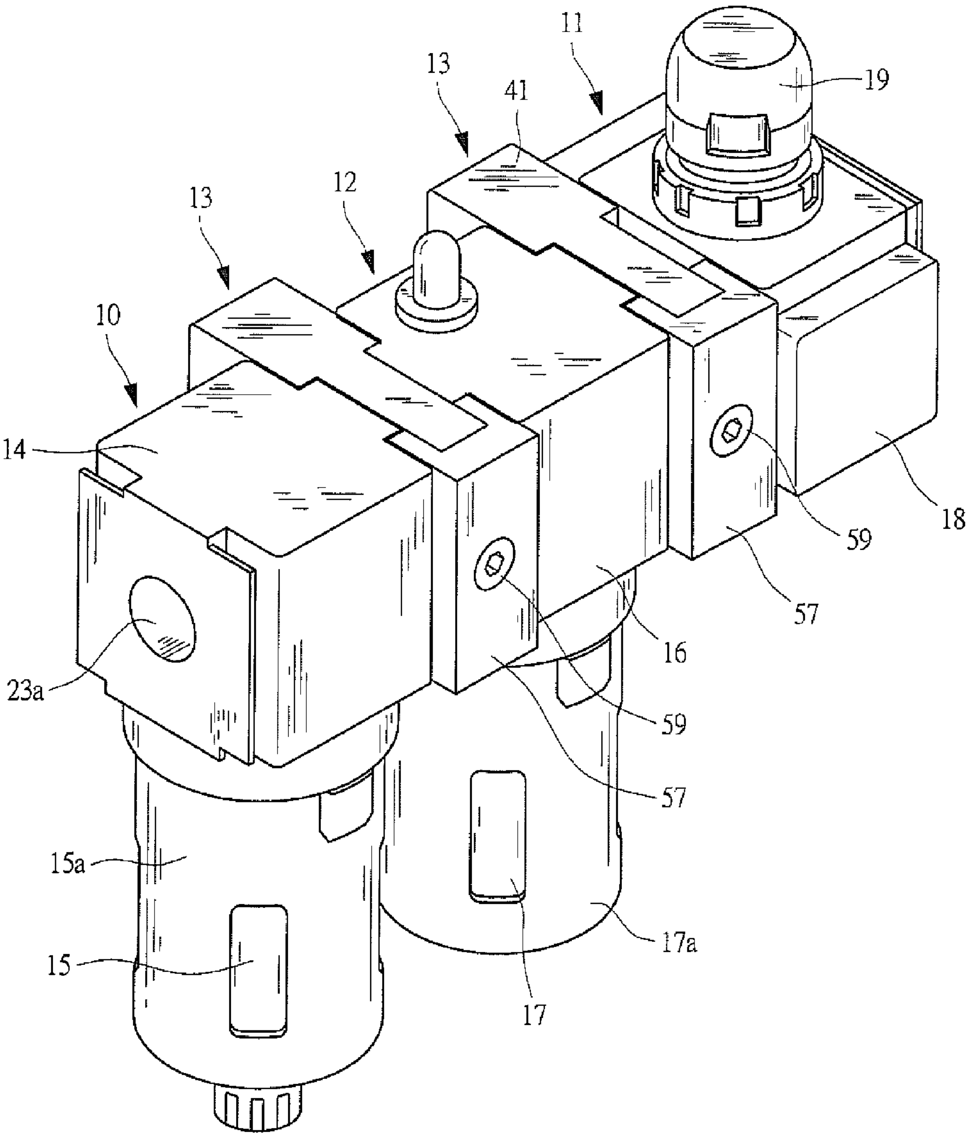
FIG. 10 is a perspective view showing a modified embodiment of the air treatment unit.

FIG. 10 illustrates the air treatment unit in which the filter 10 and the lubricator 12 are coupled to each other by a connector 13 and the regulator 11 is coupled to the lubricator 12 by another connector 13. The filter 10 and the lubricator 12 have vertical directionalities, respectively, and when these members are attached to the connector 13, they are coupled to each other such that their bowls 15 and 17 are provided next to each other. On the other hand, the regulator 11 has no vertical directionality, and thus the regulator 11 can be attached to the connector 13 such that the handle 19 is positioned on an upper side, as illustrated in FIG. 10. When the attachment is performed in this manner such that the handle 19 is positioned on the upper side, a space below the regulator 11 is effectively utilized so that another apparatus can be arranged in the space.

The connector 13 is not only capable of coupling a fluid apparatus having a vertical directionality and a fluid apparatus having no vertical directionality to each other, but also capable of coupling two fluid apparatuses each having a vertical directionality to each other as well as coupling two fluid apparatuses each having no vertical directionality to each other.

Figure 11:
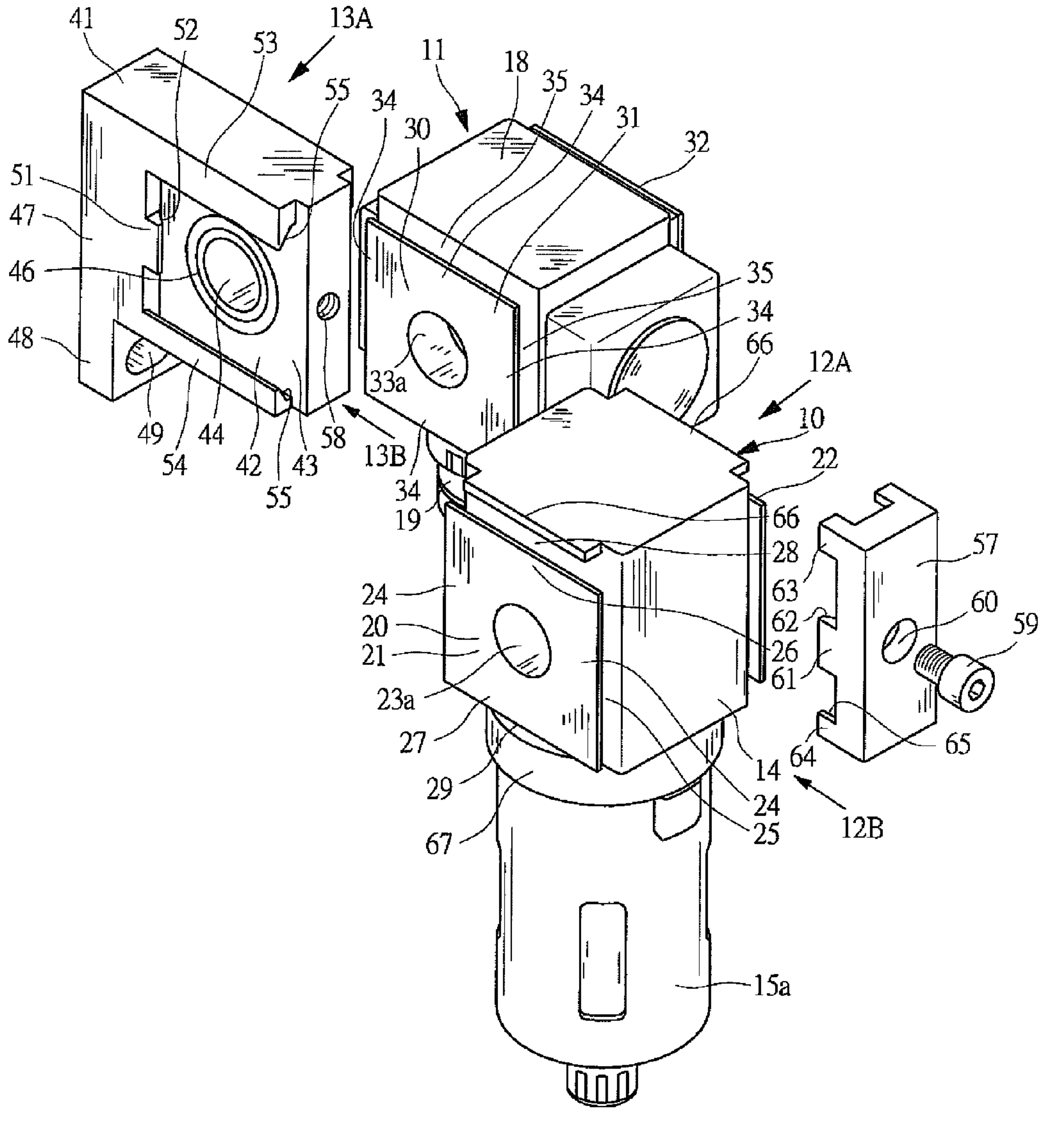
FIG. 11 is an exploded perspective view illustrating a connector according to another embodiment.
Figure 12A:
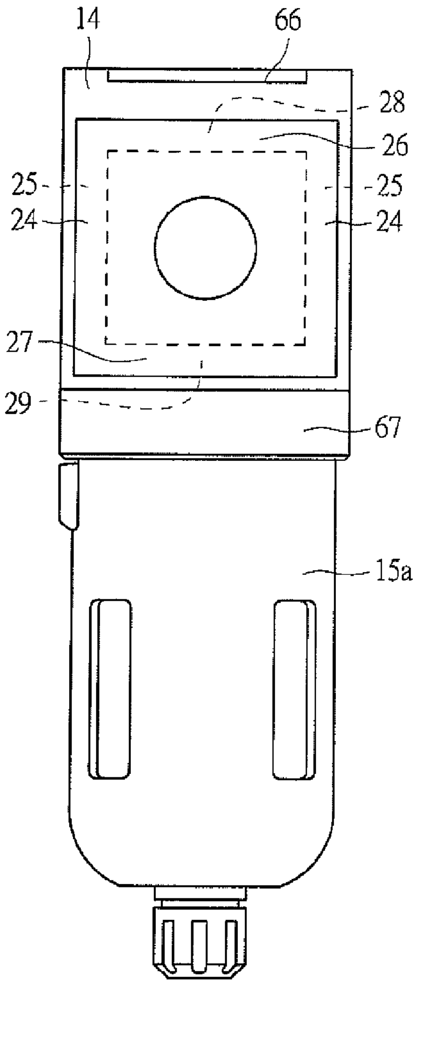
FIGS. 12A and 12B are a side view of a filter viewed from a direction of the arrow 12A in FIG. 11 and a front view of the filter viewed from a direction of the arrow 12B in FIG. 11, respectively.
Figure 12B:
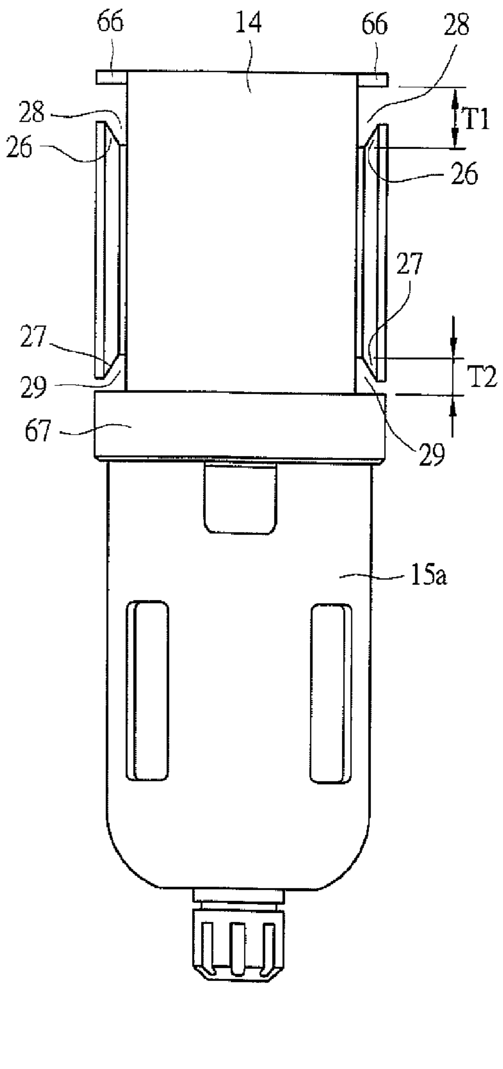
Figure 13A:
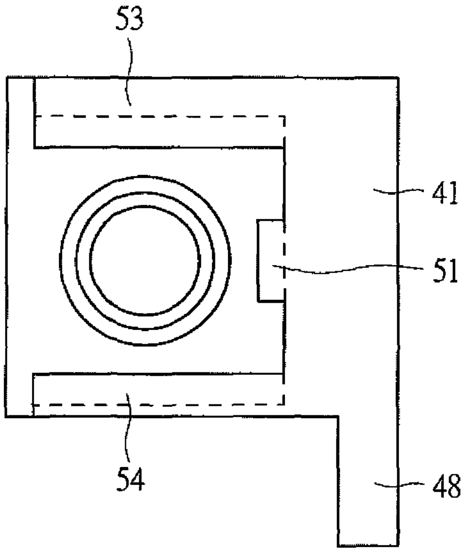
FIGS. 13A and 13B are a side view of a coupling block viewed from a direction of the arrow 13A in FIG. 11 and a front view of the coupling block viewed from a direction of the arrow 13B in FIG. 11.
Figure 13B:
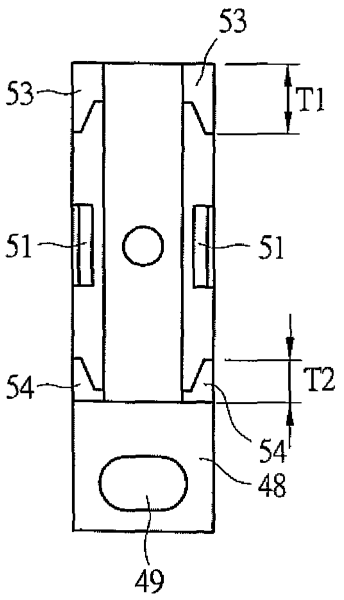

FIG. 11 is an exploded perspective view illustrating a connector according to another embodiment, FIGS. 12A and 12B are a side view of a filter viewed from a direction of the arrow 12A in FIG. 11 and a front view of the same viewed from a direction of the arrow 12B in FIG. 11, respectively, and FIGS. 13A and 13B are a side view of a coupling block viewed from a direction of the arrow 13A in FIG. 11 and a front view of the same viewed from a direction of the arrow 13B in FIG. 11, respectively.

As illustrated in FIG. 11, flanges 21 and 22 of a filter 10 have a shape similar to those of the flanges 31 and 32 of a regulator 11, and a guide portion 26 on an upper side of each of the flanges 21, 22 and a guide portion 27 on a lower side of the same are provided over an entire length L of the sides, respectively. A protrusion 66 projecting horizontally toward a butting face 20 is provided on an upper end of the coupling head 14, and a width dimension of the guide groove 28 is defined by the protrusion 66. On the other hand, a mounting ring portion 67 integrally provided at a lower end of a coupling head 18 for mounting the coupling head 18 and a bowl guard 15*a* projects toward a position substantially flush with the butting face 20, and a width dimension of the guide groove 29 is set by the mounting ring portion 67.

As illustrated in FIG. 12B, the guide groove 28 of the upper side is set to have a width of a dimension T1, the guide groove 29 on the lower side is set to have a dimension T2 smaller than the size T1, and the upper and lower guide grooves 28 and 29 are different in width dimension and shape from each other. The upper and lower guide grooves 28 and 29 different in width dimension are provided on the coupling head 14 of the filter 10 having a vertical directionality.

The flanges 31 and 32 symmetrical in vertical and horizontal directions are provided on the coupling head 18 of the regulator 11 having no vertical directionality. Therefore, the respective clamp grooves 35 of the regulator 11 are similar to those of the regulator 11 illustrated in FIG. 2, and width dimensions of the clamp grooves 35 are not specifically limited.

Upper guide protrusions 53 provided on an operating portion 47 have the width T1 corresponding to the guide groove 28 of the filter 10, respectively, and lower guide protrusions 54 have the width T2 corresponding to the guide groove 29 of the filter 10, respectively. Therefore, a coupling block 41 is attached to the filter 10 such that a bracket 48 is positioned on a lower side. On the other hand, since the clamp grooves 35 are not limited in widthwise directions, respectively, the regulator 11 is attached to the coupling block 41 even if a handle 19 is oriented in any direction of downward, upward, rightward, or leftward in FIG. 11.

Similarly, upper guide protrusions 63 provided on a fastening member 57 have the width T1 corresponding to the guide groove 28 of the filter 10, respectively, and lower guide protrusions 64 have the width T2 corresponding to the guide groove 29 of the filter 10, respectively. Therefore, the fastening member 57 is attached to the filter 10 such that the upper guide protrusions 63 are positioned on an upper side. On the other hand, the regulator 11 is attached to the fastening member 57 even if the handle 19 is oriented in any direction of downward, upward, rightward, or leftward in FIG. 11.

Figure 14:
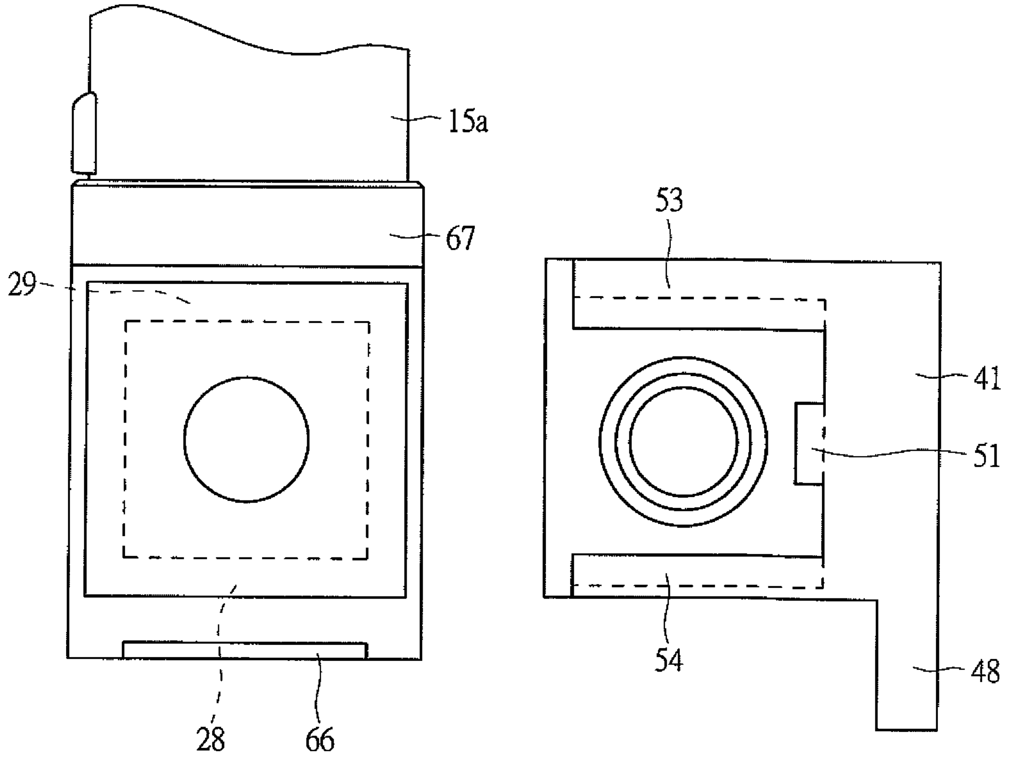
FIG. 14 is a front view illustrating a state that a coupling block illustrated in FIG. 11 is vertically inverted with respect to a filter.

FIG. 14 is a front view illustrating a state where the positional relationship of the coupling block 41 is vertically inverted with respect to the filter 10 having a vertical directionality. When it is tried to insert the guide protrusion 53 of the coupling block 41 into the guide groove 29 and insert the guide protrusion 54 into the guide groove 28, the thick guide protrusion 53 of the coupling block 41 cannot be inserted into the thin guide groove 29, so that the coupling block 41 cannot be attached to the filter 10. Regarding the fastening member 57, since the guide protrusion 63 cannot be inserted into the guide groove 29 like described the above, the fastening member 57 cannot be attached. Therefore, a worker is prevented from assembling the filter 10 and the connector 13 to each other in a state that the mutual positional relationship of the filter 10 and the connector 13 is upside-down. On the other hand, the regulator 11 having no vertical directionality can be attached to the connector 13 in any posture of upward, downward, rightward, or leftward.

Figure 15:
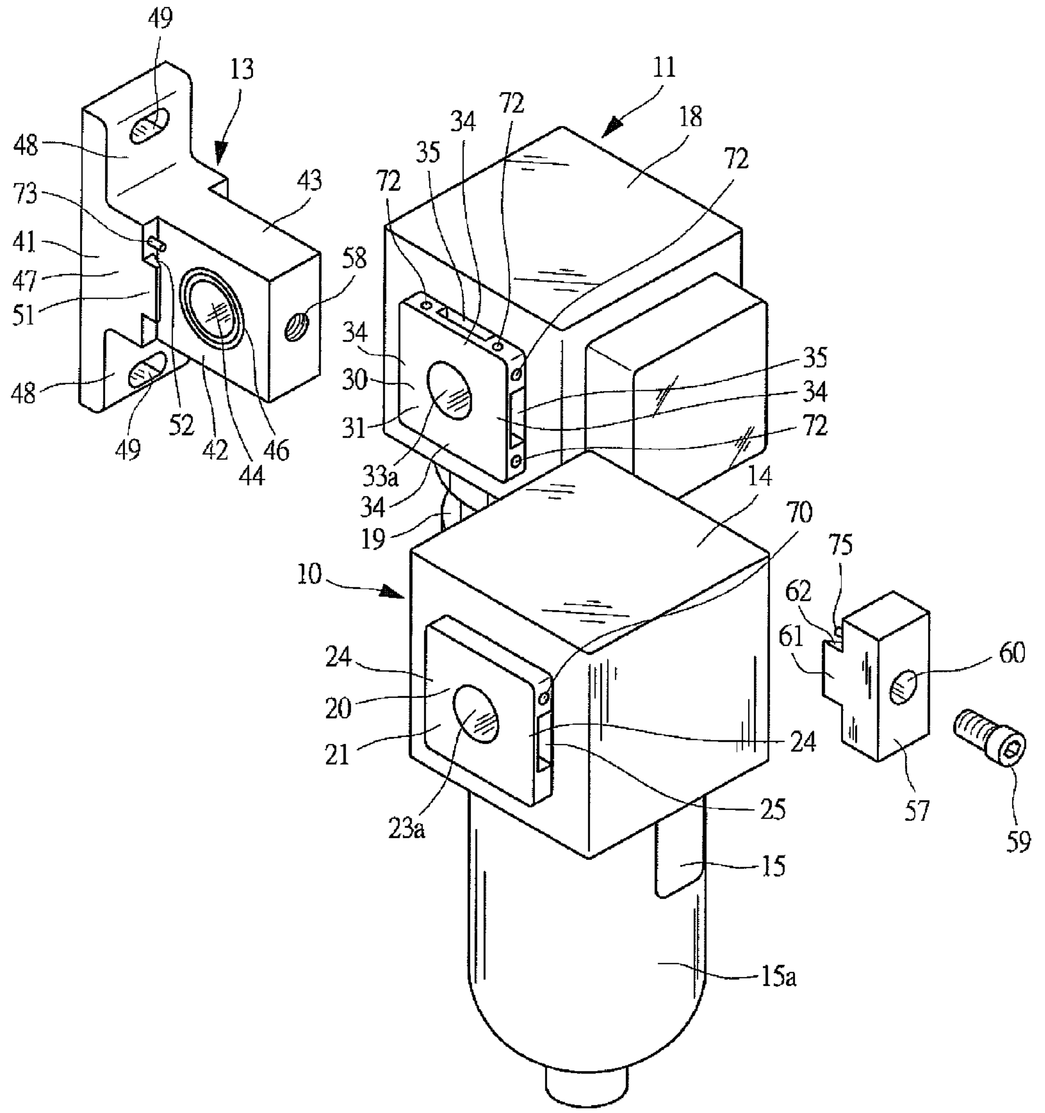
FIG. 15 is an exploded perspective view illustrating a connector according to another embodiment.
Figure 16A:
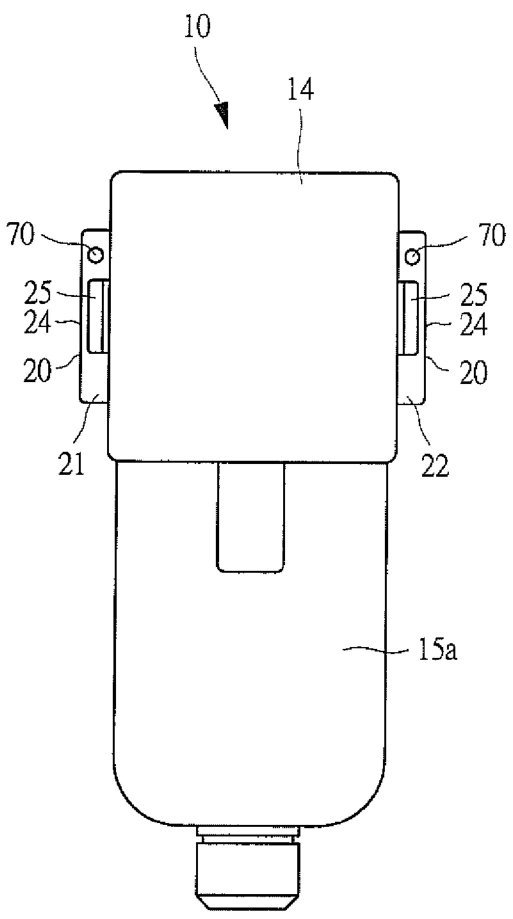
FIGS. 16A and 16B are a front view and a side view of a filter, respectively.
Figure 16B:
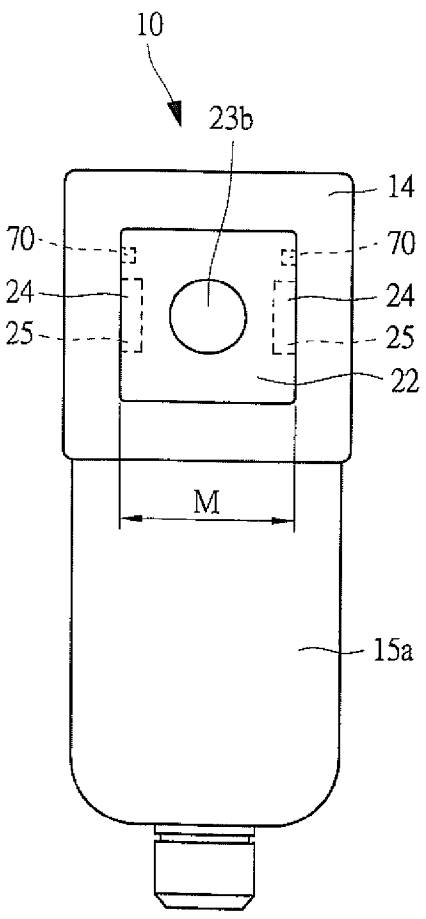
Figure 17A:
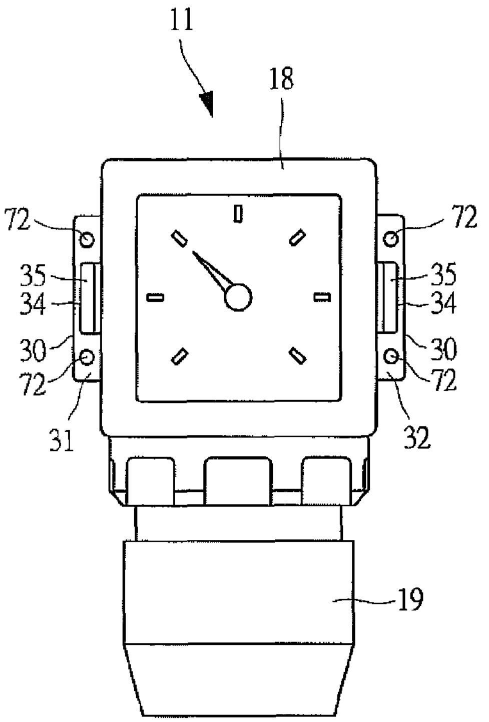
FIGS. 17A and 17A are a front view and a side view of a regulator, respectively.
Figure 17B:
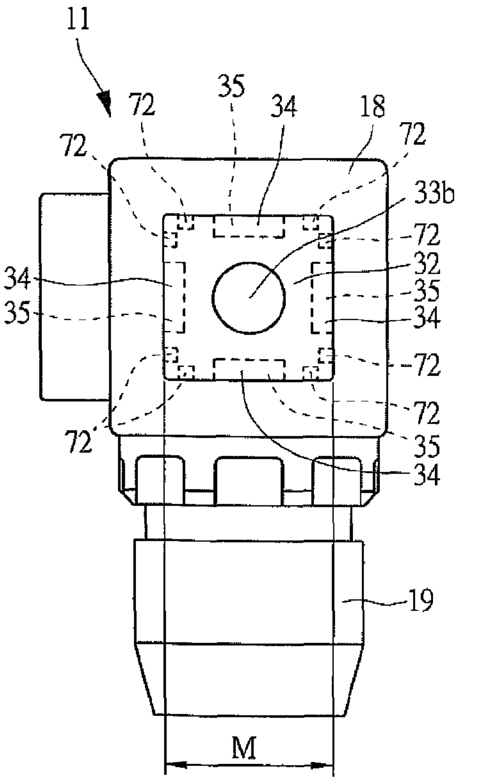
Figure 18A:
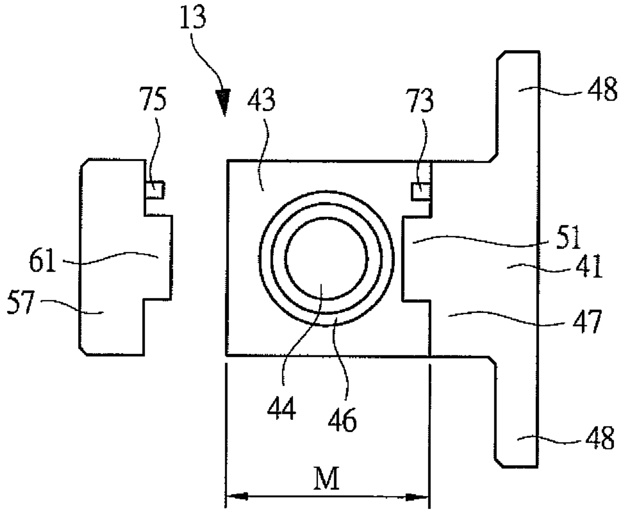
FIG. 18A is a side view of a coupling block and a fastening member.
Figure 18B:
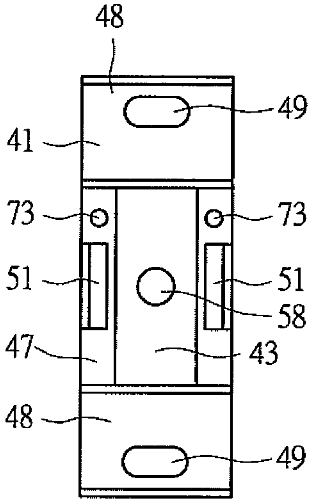
FIG. 18B is a front view of the coupling block.

FIG. 15 is an exploded perspective view illustrating a connector according to another embodiment, FIGS. 16A and 16B are a front view and a side view of a filter, respectively, FIGS. 17A and 17B are a front view and a side view of a regulator, respectively, FIG. 18A is a side view of a coupling block and a fastening member, and FIG. 18B is a front view of the coupling block.

As illustrated in FIGS. 15, 16A, and 16B, protrusions, each having a substantially-square butting face 20, are provided on two side faces being positioned on the opposite sides of the filter 10, and flanges 21 and 22, each having four fastening faces corresponding to four sides of the butting faces 20, are formed of the protrusions. Clamp grooves 25 are formed on two fastening faces of each of the flanges 21 and 22 oriented vertically and in parallel with each other, so that clamp portions 24 are formed on corresponding two sides by the clamp grooves 25. The respective clamp grooves 25 do not extend up to both ends of the fastening faces, they are provided only at central portions of the fastening faces in a longitudinal direction, and guide holes 70 with a circular shape in section are provided to be opened on the flanges 21 and 22 at upper ends of the fastening faces. In the flanges 21 and 22 of the filter 10 having a vertical directionality, thus, the guide holes 70 serving as recessed guide portions are provided only on the upper ends of two fastening faces oriented vertically and in parallel with each other, so that an upper portion and a lower portion the filter 10 are formed to be different in shape.

As illustrated in FIGS. 15, 17A and 17B, as with the butting face 20, protrusions each having a substantially-square butting face 30 and each side of the butting face 30 having a dimension M, are provided being positioned on the opposite sides on two side faces of the regulator 11, and flanges 31 and 32, and flanges 31 and 32, each having four fastening faces corresponding to four sides of the butting faces 20, are formed of the protrusions. Clamp grooves 35 are formed on four fastening faces of each of the flanges 31 and 32, and clamp portions 34 are formed on corresponding four sides by the clamp grooves 35. The respective clamp grooves 35 do not extend up to both ends of the fastening faces, provided on central portions of the fastening faces in a longitudinal direction, and guide holes 72 having a circular shape in section are provided to be opened on the flanges 31 and 32 at both ends of the fastening faces. In the flanges 31 and 32 of the regulator 11 having no vertical directionality, thus, the guide holes 72 serving as recessed guide portions are provided on both ends of each of the four fastening faces, so that a shape symmetrical in vertical and horizontal directions is formed.

As illustrated in FIG. 15, a spacer portion 43 of a coupling block 41 is formed in substantially square shape having each side with a dimension M corresponding to the flanges 22 and 31, and brackets 48 formed with mounting holes 49 are protruded and provided on both upper and lower sides of an operating portion 47. Guide protrusions 73 are provided above tongue portions 51 provided on a central portion of the operating portion 47, namely, on an upper end of the operating portion 47, so as to correspond to both faces of the spacer portion 43. Thus, the guide protrusions 73 are protruded from an inner face of the operating portion 47 in parallel with the tongue portion 51, and they are each formed in a circular shape in section corresponding to the guide hole 70 of the filter 10. Since the guide protrusions 73 are provided only on the upper end of the operating portion 47 in this manner, the coupling block 41 has a vertical directionality, and it is attached to the filter 10 such that the guide protrusions 73 are positioned on an upper side. On the other hand, since the guide holes 72 are provided on both ends of each of the four fastening faces in the regulator 11, the regulator 11 can be attached to the coupling block 41 even if the handle 19 is oriented in any direction of a vertical direction or a horizontal direction.

Similarly, guide protrusions 75 having a circular shape in section corresponding to the guide protrusions 73 of the coupling block 41 are provided on an upper end of a fastening member 57. Therefore, the fastening member 57 is attached to the filter 10 such that the guide protrusions 75 are positioned on an upper side. On the other hand, since the guide holes 72 are provided on both ends of each of the four fastening faces in the regulator 11, the regulator 11 can be attached to the coupling block 41 even if the handle 19 is oriented in any direction of a vertical direction and a horizontal direction.

In this manner, since the guide protrusions 73 and 75 are provided on the connector 13 corresponding to the guide holes 70 provided in the filter 10 having a vertical positional relationship, the guide protrusions 73 and 75 are inserted into the guide holes 70, so that wedge faces 52 and 62 of the tongue portions 51 and 61 contact wedge faces 36 of the clamp portions 24 only when the vertical positions of the filter 10 and the connector 13 match. On the contrary, when it is tried to attach a connector 13 to the filter 10 in a state that the position of the connector 13 is vertically inverted with respect to the filter 10, the guide protrusions 73 and 75 are oriented in a vertical direction and abut on two fastening faces parallel with each other, so that the connector 13 cannot be attached to the filter 10. Therefore, a worker is prevented from assembling the filter 10 and the connector 13 in a state that the vertical positional relationship of the filter 10 and the connector 13 is mutually upside-down.

On the other hand, since the guide holes 72 into which the guide protrusions 73 and 75 can be inserted are provided on the both ends of each of four fastening faces of the regulator 11 having no vertical positional relationship, the connector 13 can be attached to the regulator 11 in any posture of upward, downward, leftward, or rightward. Incidentally, such a configuration may be adopted that the guide holes 70 are provided only on lower ends of two fastening faces oriented in a vertical direction of the filter 10 and in parallel with each other and the guide protrusions 73 and 75 are provided only on the lower ends of the operating portion 47 of the coupling block 41 and the fastening member 57.

Figure 19A:
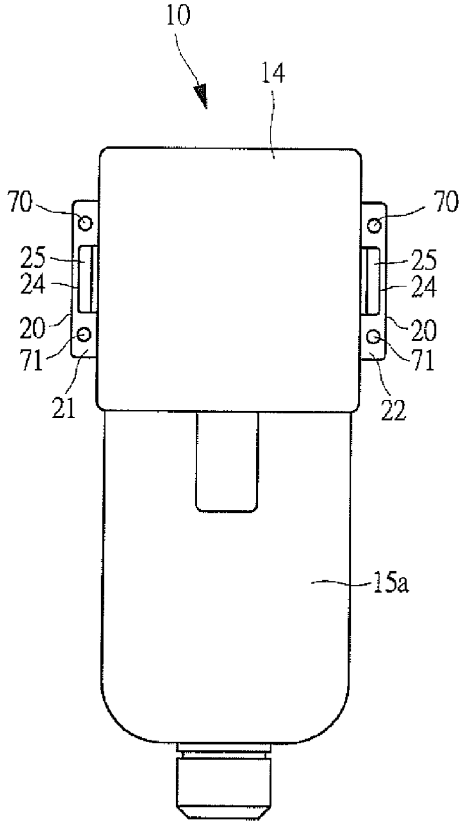
FIGS. 19A and 19B are a front view and a side view of a filter, respectively.
Figure 19B:
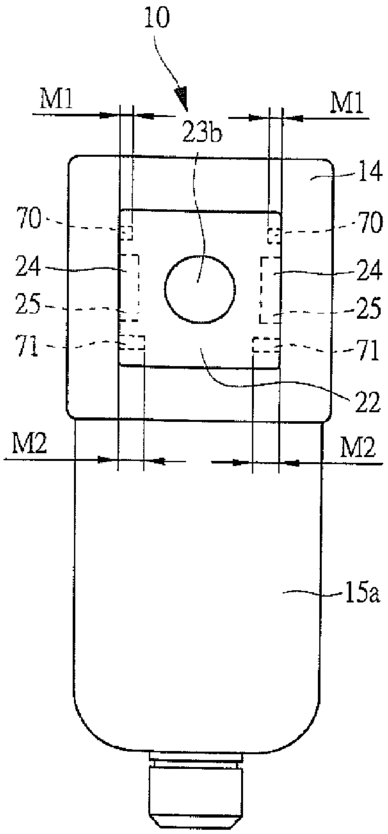
Figure 20A:
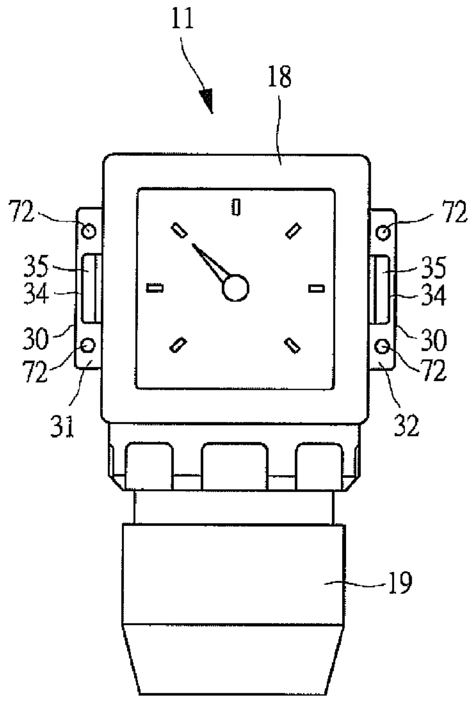
FIGS. 20A and 20B are a front view and a side view of a regulator, respectively.
Figure 20B:
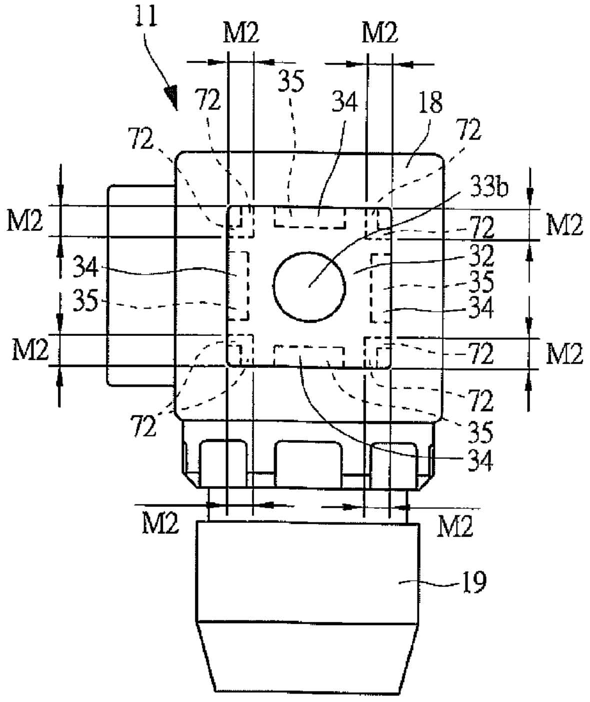
Figure 21A:
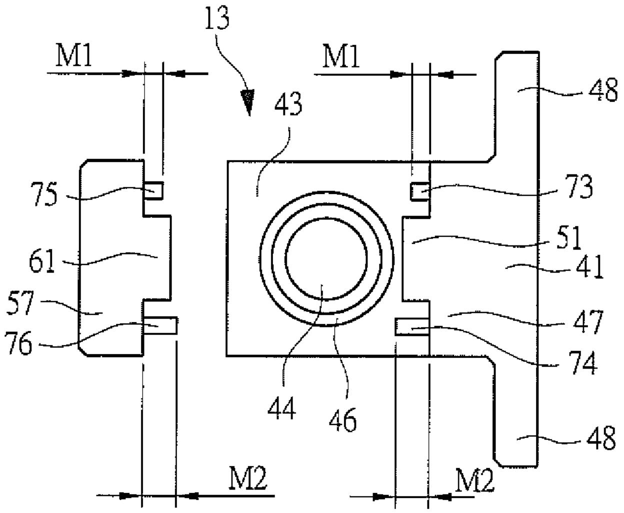
FIG. 21A is a side view of a coupling block and a fastening member.
Figure 21B:
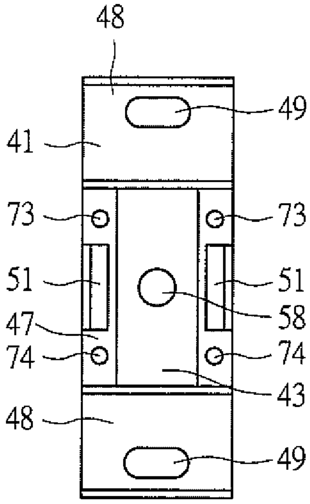
FIG. 21B is a front view of the coupling block.

FIGS. 19A to 21B illustrate a filter, a regulator and a connector according to another embodiment. FIGS. 19A and 19B are a front view and a side view of the filter, FIGS. 20A and 20B are a front view and a side view of the regulator, FIG. 21A is a side view of a coupling block and a fastening member, and FIG. 21B is a front view of the coupling block.

As illustrated in FIGS. 19A and 19B, flanges 21 and 22 of a filter 10 are each formed in a shape substantially the same as those of the flanges 21 and 22 of the filter 10 illustrated in FIG. 16. Guide holes 70 having a circular shape in section and a length dimension M1 are opened at upper ends of two fastening faces oriented vertically and in parallel with each other, namely, above clamp grooves 25, and guide holes 71 having a circular shape in section and a length dimension M2 longer than that of the guide hole 70 are opened at lower ends of the fastening faces, namely, below the clamp grooves 25. Thus, the guide holes 70 and 71 different in length dimension are provided in the flanges 21 and 22 of the filter 10 having a vertical directionality on the upper end and the lower end of two fastening faces oriented vertically and in parallel with each other, respectively, so that the upper portion and the lower portion of the flanges 21 and 22 are different in shape. The guide hole 70 forms a first recessed guide portion, while the guide hole 71 forms a second recessed guide portion.

As illustrated in FIGS. 20A and 20B, flanges 31 and 32 of a regulator 11 is each formed in a shape substantially the same as those of the flanges 31 and 32 of the regulator 11 illustrated in FIG. 17. Two guide holes 72 are opened at both ends of each of four fastening faces so as to sandwich a clamp groove 35, and the guide hole 72 has the length dimension M2 and a circular shape in section like the guide hole 71. Thus, the guide holes 72 serving as recessed guide portions are provided in the flanges 31 and 32 of the regulator 11 having no vertical directionality on both the ends of each of four fastening faces, so that a shape symmetrical in vertical and horizontal directions can be obtained.

As illustrated in FIGS. 21A and 21B, a spacer portion 43 of a coupling block 41 is formed in a shape substantially the same as that of the coupling block 41 illustrated in FIGS. 18A and 18B, and guide protrusions 73 and 74 are provided at an upper end and a lower end of an operating portion 47 corresponding to both faces of the spacer portion 43. The guide protrusion 73 on the upper side has the length dimension M1 and a circular shape in section corresponding to the guide hole 70, while the guide protrusion 74 on the lower side has the length dimension M2 and a circular shape in section corresponding to the guide hole 71. Thus, since the coupling block 41 includes the guide protrusions 73 and 74 different in length dimension and provided at the upper end and the lower end, respectively, the coupling block 41 has a vertical directionality, so that the coupling block 41 is attached to the filter 10 such that the guide protrusions 73 are positioned on an upper side while the guide protrusions 74 are positioned on a lower side. On the other hand, since guide holes 72 into which both the guide protrusions 73 and 74 can be inserted, respectively, are provided on both ends of each of four fastening faces in the regulator 11, the regulator 11 is attached to the coupling block 41 even if the handle 19 is oriented in any direction of a vertical direction or a horizontal direction. The guide protrusion 73 configures a first guide protrusion while the guide protrusion 74 configures a second guide protrusion.

Similarly, guide protrusions 75 having a circular shape in section and the length dimension M1 and guide protrusions 76 having a circular shape in section and the length dimension M2 which correspond to the guide protrusions 73 and 74 of the coupling block 41 are provided on an upper end and a lower end of a fastening member 57. Therefore, the fastening member 57 is attached to the filter 10 such that the guide protrusions 75 are positioned on an upper side, while the guide protrusions 76 are positioned on a lower side. On the other hand, since guide holes 72 into which both the guide protrusions 75 and 76 can be inserted, respectively, are provided on both the ends of each of four fastening faces in the regulator 11, the regulator 11 can be attached to the coupling block 41 even if the handle 19 is oriented in any direction of a vertical direction or a horizontal direction. The guide protrusion 75 configures a third guide protrusion, while the guide protrusion 76 configures a fourth guide protrusion.

Thus, since the guide protrusions 73 to 76 are provided on a connector 13 corresponding to the guide holes 70 and 71 provided on the filter 10 having a vertical positional relationship, the guide protrusions 73 to 76 are inserted into the guide holes 70 and 71 so that wedge faces 52 and 62 of tongue portions 51 and 61 contact wedge faces 36 of a clamp portion 24 only when the vertical positions of the filter 10 and the connector 13 match. On the contrary, when it is tried to attach the connector 13 to the filter 10 in a state that the position of the connector 13 is vertically inverted with respect to the filter 10, the guide protrusions 74 and 76 are not inserted into the guide holes 70 completely, so that the connector 13 cannot be attached to the filter 10. Therefore, a worker is prevented from assembling the filter 10 and the connector 13 in a state that the vertical positional relationship of the filter 10 and the connector 13 is upside-down.

On the other hand, since guide holes 72 into which any one of the guide protrusions 73 to 76 can be inserted are provided on both ends of each of four fastening faces in the regulator 11 having no vertical positional relationship, the connector 13 can be attached to the regulator 11 in any posture of upward, downward, rightward, or leftward. Incidentally, such a configuration may be adopted that the vertical positional relationship of the guide holes 70 and 71 of the filter 10 is inverted and the vertical positional relationship of the guide protrusions 73 and 74 and the guide protrusions 75 and 76 of the connector 13 is inverted.

Figure 22A:
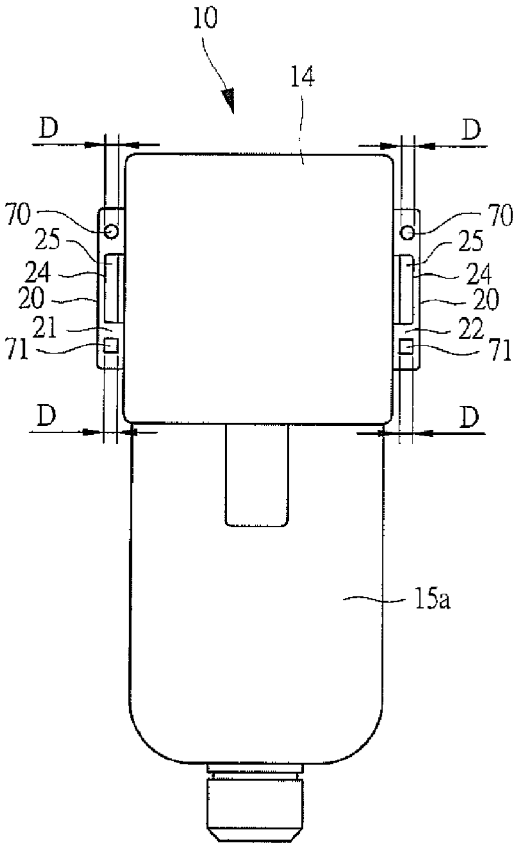
FIGS. 22A and 22B are a front view and a side view of a filter, respectively.
Figure 22B:
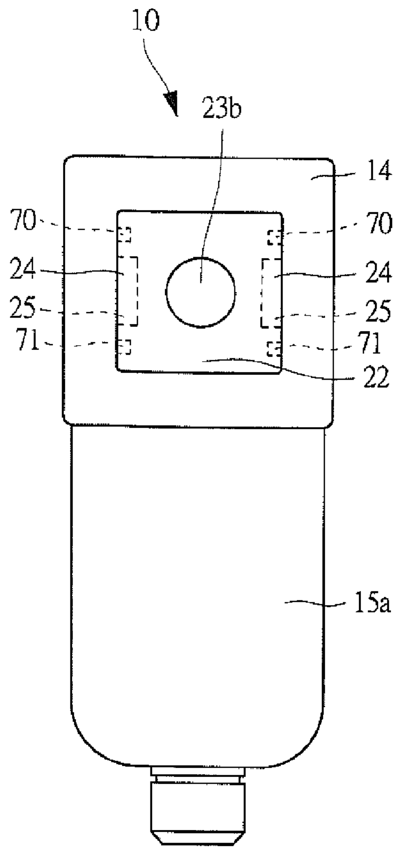
Figure 23A:
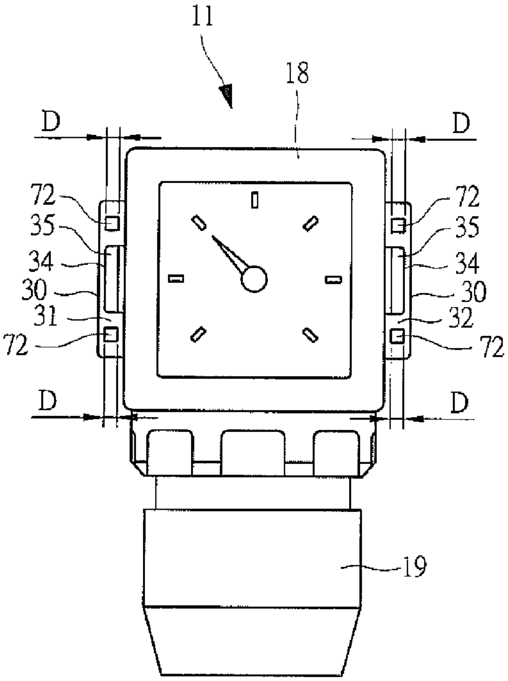
FIGS. 23A and 23B are a front view and a side view of a regulator, respectively.
Figure 23B:
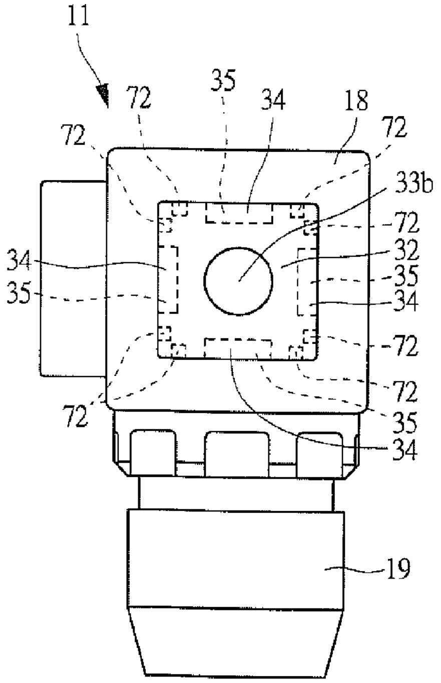
Figure 24A:
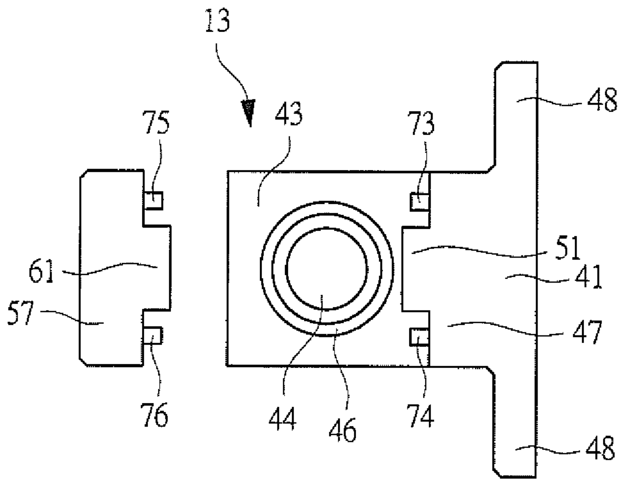
FIG. 24A is a side view of a coupling block and a fastening member.
Figure 24B:
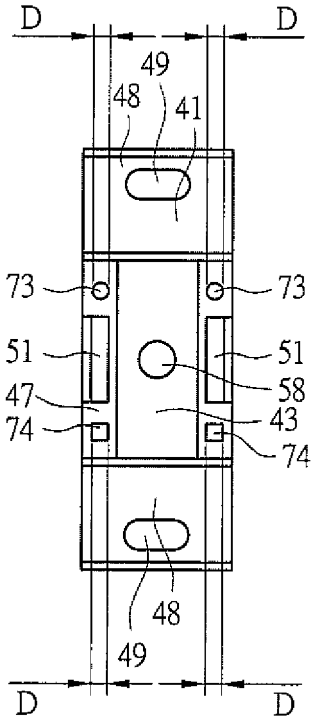
FIG. 24B is a front view of the coupling block.

FIGS. 22A to 24B illustrate a filter, a regulator and a connector according to another embodiment. FIGS. 22A and 22B are a front view and a side view of the filter, respectively, FIGS. 23A and 23B are a front view and a side view of the regulator, respectively, FIG. 24A is a side view of a coupling block and a fastening member, and FIG. 24B is a front view of the coupling block.

As illustrated in FIGS. 22A and 22B, flanges 21 and 22 of a filter 10 are each formed in a shape substantially the same as those of the flanges 21 and 22 of the filter 10 illustrated in FIGS. 16A and 16B. Guide holes 70 having a circular shape in section and a diameter D are opened at upper ends of two fastening faces oriented vertically and in parallel with each other, namely, above clamp grooves 25, and guide holes 71 having a square shape in section and the dimension of one side D are opened at lower ends of the fastening faces, namely, below the clamp grooves 25. Thus, the guide holes 70 and 71 different in sectional shape are provided in the flanges 21 and 22 of the filter 10 having a vertical directionality on upper ends and lower ends of two fastening faces oriented vertically and in parallel with each other, so that the upper portion and the lower portion of the filter 10 are different in shape.

As illustrated in FIGS. 23A and 23B, flanges 31 and 32 of a regulator 11 are each formed in a shape substantially the same as those of the flanges 31 and 32 of the regulator 11 illustrated in FIGS. 17A and 17B. Two guide holes 72 are formed at both ends of each of four fastening faces so as to sandwich a clamp groove 35, and the guide hole 72 is formed in a square shape in section having one side of the dimension D like the guide hole 71. Thus, the guide holes 72 are provided in the flanges 31 and 32 of the regulator 11 having no vertical directionality on both the ends of each of four fastening faces, so that a shape symmetrical in vertical and horizontal directions is obtained.

As illustrated in FIGS. 24A and 24B, a spacer portion 43 of a coupling block 41 is formed in a shape approximately similar to that of the coupling block 41 illustrated in FIGS. 18A and 18B, and guide protrusions 73 and 74 are provided at an upper end and a lower end of an operating portion 47 corresponding to both faces of the spacer portion 43. The guide protrusion 73 on the upper side has a circular shape in section with a diameter D corresponding to the guide hole 70, while the guide protrusion 74 on the lower side has a square shape in section with one side of a size D corresponding to the guide hole 71. Thus, since the coupling block 41 includes the guide protrusions 73 and 74 different in sectional shape provided on the upper end and the lower end thereof, respectively, the coupling block 41 has a vertical directionality, so that the coupling block 41 is attached to the filter 10 such that the guide protrusions 73 are positioned on an upper side, while the guide protrusions 74 are positioned on a lower side. On the other hand, since the guide holes 72 into which both the guide protrusions 73 and 74 can be inserted are provided on both ends of each of the four fastening faces in the regulator 11, the regulator 11 is attached to the coupling block 41 even if the handle 19 is oriented in any direction of a vertical direction or a horizontal direction.

Similarly, guide protrusions 75 having a circular shape in section and the diameter D and guide protrusions 76 having a square shape in section and one side of the dimension D which correspond to the guide protrusions 73 and 74 of the coupling block 41 are provided on an upper end and a lower end of a fastening member 57. Therefore, the fastening member 57 is attached to the filter 10 such that the guide protrusions 75 are positioned on an upper side, while the guide protrusions 76 are positioned on a lower side. On the other hand, since guide holes 72 into which both the guide protrusions 75 and 76 can be inserted are provided on both the ends of each of the four fastening faces in the regulator 11, the regulator 11 can be attached to the coupling block 41 even if the handle 19 is oriented in any direction of a vertical direction or a horizontal direction.

Thus, since the guide protrusions 73 to 76 are provided on the connector 13 corresponding to the guide holes 70 and 71 provided on the filter 10 having a vertical positional relationship, the guide protrusions 73 to 76 are inserted into the guide holes 70 and 71 so that wedge faces 52 and 62 of tongue portions 51 and 61 contact wedge faces 36 of clamp portion 24 only when the vertical positions of the filter 10 and the connector 13 match. On the contrary, when it is tried to attach the connector 13 to the filter 10 in a state that the vertical positional relationship of the connector 13 and the filter 10 is inverted, the guide protrusions 74 and 76 cannot be inserted into the guide holes 70, so that the connector 13 cannot be attached to the filter 10. Therefore, a worker is prevented from assembling the filter 10 and the connector 13 in a state that the vertical positional relation of the filter 10 and the connector 13 is mutually upside-down.

On the other hand, since guide holes 72 into which any one of the guide protrusions 73 to 76 can be inserted are provided on both ends of each of the four fastening faces in the regulator 11 having no vertical positional relationship, the connector 13 can be attached to the regulator 11 in any posture of upward, downward, rightward, or leftward. Incidentally, such a configuration may be adopted that the vertical positional relationship of the guide holes 70 and 71 of the filter 10 is inverted and the vertical positional relationship of the guide protrusions 73 and 74 and the guide protrusions 75 and 76 of the connector 13 is inverted.

Figure 25A:
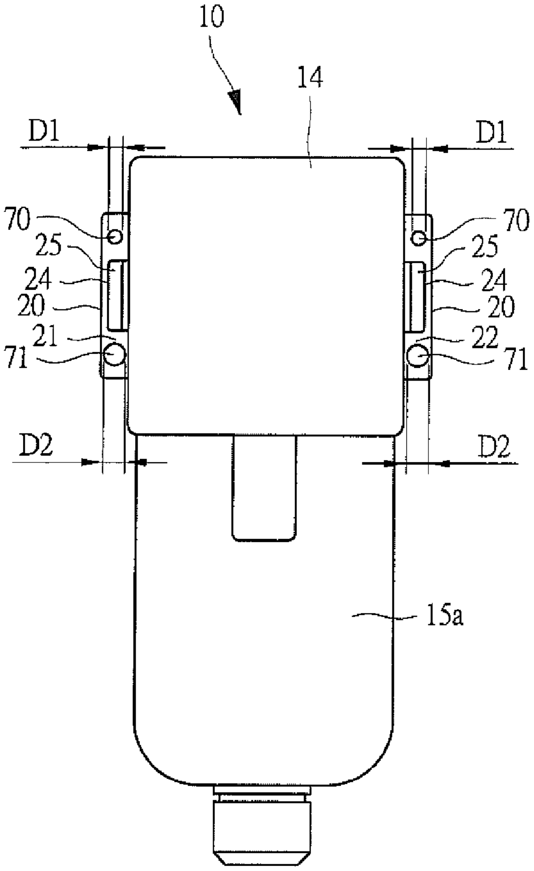
FIGS. 25A and 25B are a front view and a side view of a filter, respectively.
Figure 25B:
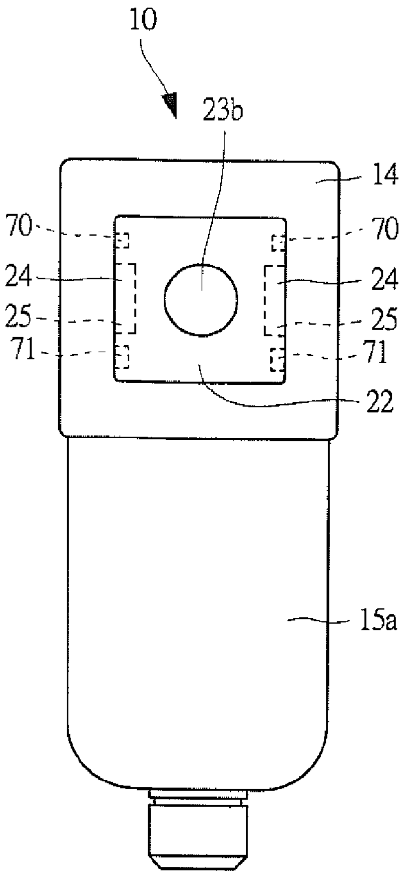
Figure 26A:
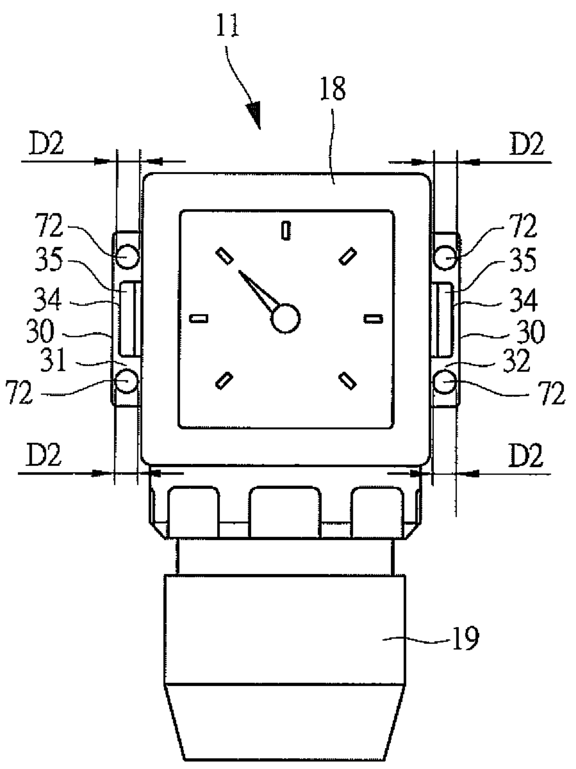
FIGS. 26A and 26B are a front view and a side view of a regulator, respectively.
Figure 26B:
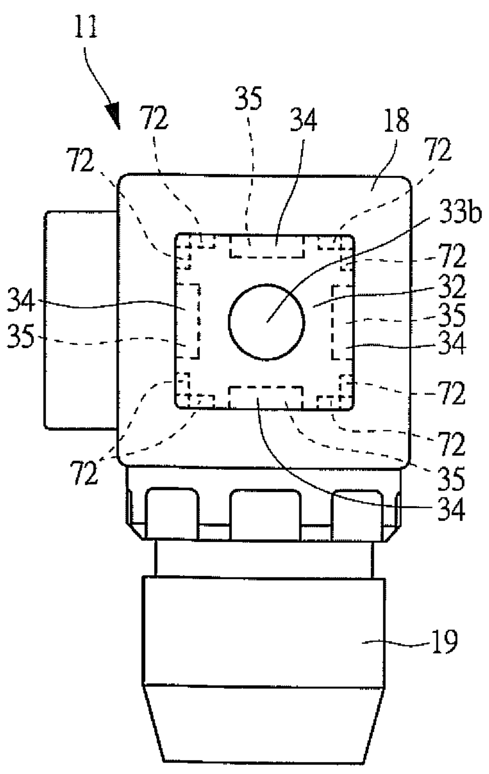
Figure 27A:
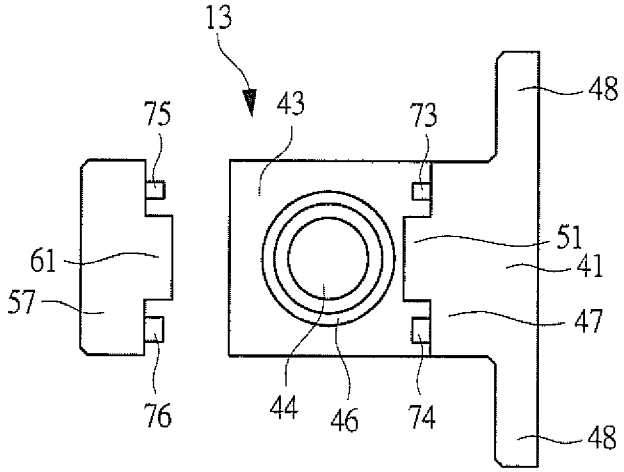
FIG. 27A is a side view of a coupling block and a fastening member.
Figure 27B:
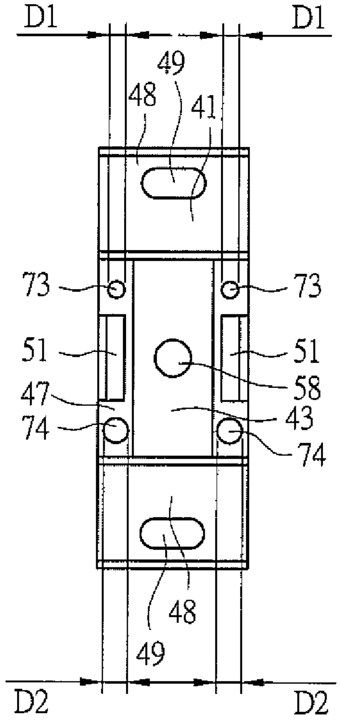
FIG. 27B is a front view of the coupling block.

FIGS. 25A to 27B illustrate a filter, a regulator and a connector according to another embodiment. FIGS. 25A and 25B are a front view and a side view of the filter, respectively, FIGS. 26A and 26B are a front view and a side view of the regulator, respectively, FIG. 27A is a side view of a coupling block and a fastening member, and FIG. 27B is a front view of the coupling block.

As illustrated in FIGS. 25A and 25B, flanges 21 and 22 of a filter 10 are each formed in a shape substantially the same as those of the flanges 21 and 22 of the filter 10 illustrated in FIGS. 16A and 16B. Guide holes 70 having a circular shape in section and a diameter D1 are opened at upper ends of two fastening faces oriented vertically and in parallel with each other, namely, above clamp grooves 25, and guide holes 71 having a circular shape in section and a diameter D2 larger than the diameter of the guide hole 70 are opened at lower ends of the fastening faces, namely, below the clamp grooves 25. Thus, the guide holes 70 and 71 different in sectional shape, respectively, are provided in the flanges 21 and 22 of the filter 10 having a vertical directionality on upper ends and lower ends of the two fastening faces oriented vertically and in parallel with each other, so that the upper portion and the lower portion of the filter 10 are different in shape.

As illustrated in FIGS. 26A and 26B, flanges 31 and 32 of a regulator 11 are each formed in a shape substantially the same as those of the flanges 31 and 32 of the regulator 11 illustrated in FIGS. 17A and 17B. Two guide holes 72 are opened at both ends of each of four fastening faces so as to sandwich a clamp groove 35, and the guide holes 72 are formed in a circular shape in section having the diameter D2 like the guide hole 71. Thus, the guide holes 72 are provided in the flanges 31 and 32 of the regulator 11 having no vertical directionality on both the ends of each of the four fastening faces, so that a shape symmetrical in vertical and horizontal directions can be obtained.

As illustrated in FIGS. 27A and 27B, a spacer portion 43 of a coupling block 41 is formed in a shape substantially the same as that of the coupling block 41 illustrated in FIGS. 18A and 18B, and guide protrusions 73 and 74 are provided at an upper end and a lower end of an operating portion 47 corresponding to both faces of the spacer portion 43. The guide protrusion 73 on the upper side has a circular shape in section having the diameter D1 corresponding to the guide hole 70, while the guide protrusion 74 on the lower side has a circular shape in section having the diameter D2 corresponding to the guide hole 71. Thus, since the coupling block 41 includes the guide protrusions 73 and 74 different in sectional shape provided on the upper end and the lower end thereof, respectively, the coupling block 41 has a vertical directionality so that the coupling block 41 is attached to the filter 10 such that the guide protrusions 73 are positioned on an upper side, while the guide protrusions 74 are positioned on a lower side. On the other hand, since the guide holes 72 into which both the guide protrusions 73 and 74 can be inserted are provided on both ends of each of the four fastening faces in the regulator 11, the regulator 11 is attached to the coupling block 41 even if the handle 19 is oriented in any direction of a vertical direction or a horizontal direction.

Similarly, guide protrusions 75 having a circular shape in section and the diameter D1 and guide protrusions 76 having a circular shape in section and the diameter D2 which correspond to the guide protrusions 73 and 74 of the coupling block 41 are provided on an upper end and a lower end of a fastening member 57. Therefore, the fastening member 57 is attached to the filter 10 such that the guide protrusions 75 are positioned on an upper side while the guide protrusions 76 are positioned on a lower side. On the other hand, since the guide holes 72 into which both the guide protrusions 75 and 76 can be inserted are provided on both the ends of each of the four fastening faces in the regulator 11, the regulator 11 can be attached to the coupling block 41 even if the handle 19 is oriented in any direction of a vertical direction or a horizontal direction.

Thus, since the guide protrusions 73 to 76 are provided on the connector 13 corresponding to the guide holes 70 and 71 provided on the filter 10 having a vertical positional relationship, the guide protrusions 73 to 76 are inserted into the guide holes 70 and 71 so that wedge faces 52 and 62 of tongue portions 51 and 61 contact wedge faces 36 of a clamp portion 24 only when vertical positions of the filter 10 and the connector 13 match. On the contrary, when it is tried to attach the connector 13 to the filter 10 in a state that the vertical positional relationship of the connector 13 to the filter 10 is inverted, the guide grooves 74 and 76 cannot be inserted into the guide holes 70, so that the connector 13 cannot be attached to the filter 10. Therefore, a worker is prevented from assembling the filter 10 and the connector 13 in a state that the mutual vertical positional relationship of the filter 10 and the connector 13 is inverted.

On the other hand, since the guide holes 72 into which any one of the guide protrusions 73 to 76 can be inserted are provided on both ends of each of the four fastening faces in the regulator 11 having no vertical positional relationship, the connector 13 can be attached to the regulator 11 in any posture of upward, downward, rightward, or leftward. Incidentally, such a configuration may be adopted that the vertical positional relationship of the guide holes 70 and 71 of the filter 10 is inverted and the vertical positional relationship of the guide protrusions 73 and 74 and the guide protrusions 75 and 76 of the connector 13 is inverted.

INDUSTRIAL APPLICABILITY

The present invention is not limited to the foregoing embodiments and various modifications can be made within the scope of the present invention. For example, coupling of a fluid apparatus other than the filter 10, the regulator 11 and the lubricator 12 can be performed, where a fluid apparatus having a directionality is provided with a flange similar to that of the filter 10 or the lubricator 12, while a fluid apparatus having no directionality is provided with a flange similar to that of the regulator 11. As the fluid apparatus having no directionality, there are various valves such as a residual pressure exhaust valve other than a pressure reducing value, namely, the regulator 11. Further, the shapes of the upper guide groove 28 and 29 or the guide holes 70 and 71 of the filter 10 and the lubricator 12 can be modified variously as far as they are different from each other.

While the present invention has been illustrated and described with respect to a particular embodiment thereof, it should be appreciated by those of ordinary skill in the art that various modifications to this invention may be made without departing from the spirit and scope of the present.

What is claimed is:

1. A connector connecting two fluid apparatuses of the same type or different types selected from: a first fluid apparatus in which a flange having a butting face at which a fluid port is opened is provided on a coupling head, the first fluid apparatus having clamp portions with clamp grooves formed parallel with each other at two sides of the flange between the clamp portions and the coupling head; and a second fluid apparatus in which a flange having a butting face at which a fluid port is opened is provided on a coupling head, the second fluid apparatus having clamp portions with clamp grooves formed at four sides of the flange between the clamp portions and the coupling head, the connector comprising:

a coupling block provided with: a spacer portion having seal faces contacting the butting faces of the two fluid apparatuses and formed on both faces of the spacer portion, and having a through-hole causing the fluid ports of the two fluid apparatuses to communicate with each other; and an operating portion provided on one side of the spacer portion;

a pair of tongue portions provided on the operating portion corresponding to both the faces of the spacer portion;

a seal member attached between the butting face and the seal face so as to surround the through-hole;

a fastening member provided with tongue portions opposed to the tongue portions of the operating portion and contacting wedge faces of the clamp portions, the fastening member being detachably fastened to the other side of the coupling block; and guide protrusions provided on end of the operating portion, the guide protrusions being inserted into recessed guide portions formed on two sides of the flange when the coupling block is attached to the flange of the first fluid apparatus by inserting the tongue portions into one of the clamp grooves on the two sides, and the guide protrusions being capable of being inserted into any of recessed guide portions formed on the four sides of the flange, respectively, when the coupling block being attached to the flange of the second fluid apparatus by inserting the tongue portions into any of the clamp grooves on the four sides, wherein the coupling block has first and second coupling states, in the first coupling state, the coupling block allows the tongue portions to contact the respective wedge faces of the clamp portions of the first and second fluid apparatuses arranged in a direction parallel to each other, and in the second coupling state, the coupling block allows the tongue portions to contact the respective wedge faces of the clamp portions of the first and second fluid apparatuses arranged in directions orthogonal to each other.

2. The connector according to claim 1, wherein the recessed guide portions are formed between guide portions, which are provided on the other two sides of the flange of the first fluid apparatus, and the coupling head; the guide protrusions are inserted into the recessed guide portions formed on the other two sides of the flange when the coupling block is attached to the flange of the first fluid apparatus; and the clamp grooves on the four sides form the recessed guide portions into which the guide protrusions are inserted when the coupling block is attached to the flange of the second fluid apparatus.

3. The connector according to claim 2, wherein a first guide protrusion provided on one end of the operating portion has a shape corresponding to one of the recessed guide portions on the two sides of the first fluid apparatus, and a second guide protrusion provided on the other end of the operating portion has a shape corresponding to the other one of the recessed guide portions on the two sides of the first fluid apparatus, the first and second guide protrusions are different in shape from each other.

4. The connector according to claim 3, wherein the one of the recessed guide portions and the other one of the recessed guide portions are different in length dimension from each other, and the first guide protrusion has a length corresponding to the one of the recessed guide portions, while the second guide protrusion has a length corresponding to the other one of the recessed guide portions.

5. The connector according to claim 3, wherein a third guide protrusion projecting toward the first guide protrusion and having a shape corresponding to the first guide protrusion is provided on one end of the fastening member, and a fourth guide protrusion projecting toward the second guide protrusion and having a shape corresponding to the second guide protrusion is provided on the other end of the fastening member.

6. The connector according to claim 1, wherein clamp grooves are formed to an entire peripheral portion of the clamp portion of the second fluid apparatus, and the guide protrusions are inserted into any of the clamp grooves on the four sides when the coupling block is attached to the flange of the second fluid apparatus.

* * * * *